(12) United States Patent
Marburger

(10) Patent No.: US 12,479,056 B2
(45) Date of Patent: Nov. 25, 2025

(54) WORKPIECE TOOLS AND TECHNIQUES

(71) Applicant: Jason A. Marburger, Spokane, WA (US)

(72) Inventor: Jason A. Marburger, Spokane, WA (US)

(73) Assignee: Fireball Tool Works, LLC, Santa Fe Springs, CA (US)

( * ) Notice: Subject to any disclaimer, the term of this patent is extended or adjusted under 35 U.S.C. 154(b) by 0 days.

(21) Appl. No.: 17/941,821

(22) Filed: Sep. 9, 2022

(65) Prior Publication Data

US 2023/0001527 A1    Jan. 5, 2023

Related U.S. Application Data

(63) Continuation-in-part of application No. 17/666,348, filed on Feb. 7, 2022, now abandoned, which is a continuation of application No. 16/872,133, filed on May 11, 2020, now Pat. No. 11,241,765, which is a continuation of application No. 15/707,746, filed on Sep. 18, 2017, now Pat. No. 10,646,973.

(60) Provisional application No. 62/505,941, filed on May 14, 2017.

(51) Int. Cl.
  *B23Q 3/18* (2006.01)
  *B23K 37/04* (2006.01)
  *B23P 19/04* (2006.01)
  *B23Q 3/00* (2006.01)

(52) U.S. Cl.
  CPC .......... *B23Q 3/186* (2013.01); *B23K 37/0443* (2013.01); *B23P 19/04* (2013.01); *B23Q 3/005* (2013.01)

(58) Field of Classification Search
  CPC .... B23Q 3/186; B23Q 3/005; B23K 37/0443; B23P 19/04; B25B 11/00; B25H 7/00
  See application file for complete search history.

(56) References Cited

U.S. PATENT DOCUMENTS

| | | | |
|---|---|---|---|
| 2,108,077 | A | 2/1938 | Robinson |
| 2,328,040 | A | 8/1943 | Weightman |
| 2,371,831 | A | 3/1945 | Leming |
| 2,835,978 | A | 5/1958 | Krisel |
| 3,824,744 | A | 7/1974 | Petrant |

(Continued)

OTHER PUBLICATIONS

"Corrected Notice of Allowability", U.S. Appl. No. 15/707,628, filed Mar. 30, 2020, 2 pages.

(Continued)

*Primary Examiner* — Moshe Wilensky
(74) *Attorney, Agent, or Firm* — FIG. 1 Patents

(57) ABSTRACT

Workpiece tools and techniques are described. In one example, a workpiece tool includes different side panels that provide surfaces for workpiece alignment. Further, a workpiece tool includes apertures that can align with a work surface such as a welding table. An adjustable tool is also described that includes a tool body and a slidable member that is slidable relative to the tool body. The slidable member, for instance, represents a measurement tool that can be used to measure object dimensions. Further, the tool body includes different side panels that are arranged to enable a variety of different usage scenarios such as include different positions of the slidable member relative to an adjacent object and/or surface.

20 Claims, 35 Drawing Sheets

(56) References Cited

U.S. PATENT DOCUMENTS

| | | |
|---|---|---|
| 4,805,315 A | 2/1989 | Nesbitt |
| 5,024,002 A | 6/1991 | Possati |
| 5,653,038 A | 8/1997 | Hunter |
| 5,855,073 A | 1/1999 | Boelling |
| 6,314,652 B1 | 11/2001 | English |
| 6,453,574 B1 | 9/2002 | Chen |
| 6,758,016 B2 | 7/2004 | Gobeil |
| 7,481,004 B2 | 1/2009 | Krohmer et al. |
| 8,074,368 B2 | 12/2011 | Atwood |
| 10,639,757 B2 | 5/2020 | Marburger |
| 10,646,973 B2 | 5/2020 | Marburger |
| D902,269 S | 11/2020 | Marburger |
| 11,241,765 B2 | 2/2022 | Marburger |
| 2001/0045695 A1 | 11/2001 | Andronica |
| 2003/0140512 A1 | 7/2003 | Jevons et al. |
| 2007/0221292 A1 | 9/2007 | Krohmer et al. |
| 2007/0245581 A1 * | 10/2007 | Hios ............. B43L 7/10 33/429 |
| 2009/0090012 A1 | 4/2009 | Varnedoe |
| 2017/0211919 A1 | 7/2017 | Babich |
| 2018/0141178 A1 | 5/2018 | Marburger |
| 2018/0161946 A1 | 6/2018 | Marburger |
| 2020/0290164 A1 | 9/2020 | Marburger |

OTHER PUBLICATIONS

"Corrected Notice of Allowability", U.S. Appl. No. 15/707,746, filed Apr. 3, 2020, 2 pages.

"Final Office Action", U.S. Appl. No. 15/707,628, filed Oct. 16, 2019, 9 pages.

"Non-Final Office Action", U.S. Appl. No. 15/707,628, filed Jun. 6, 2019, 13 pages.

"Non-Final Office Action", U.S. Appl. No. 15/707,746, filed Oct. 1, 2019, 9 pages.

"Notice of Allowance", U.S. Appl. No. 15/707,746, filed Jan. 2, 2020, 5 pages.

"Notice of Allowance", U.S. Appl. No. 16/872,133, filed Sep. 29, 2021, 9 pages.

"Notice of Allowance", U.S. Appl. No. 15/707,628, filed Dec. 18, 2019, 5 pages.

"Restriction Requirement", U.S. Appl. No. 15/707,746, filed Jul. 25, 2019, 6 pages.

* cited by examiner

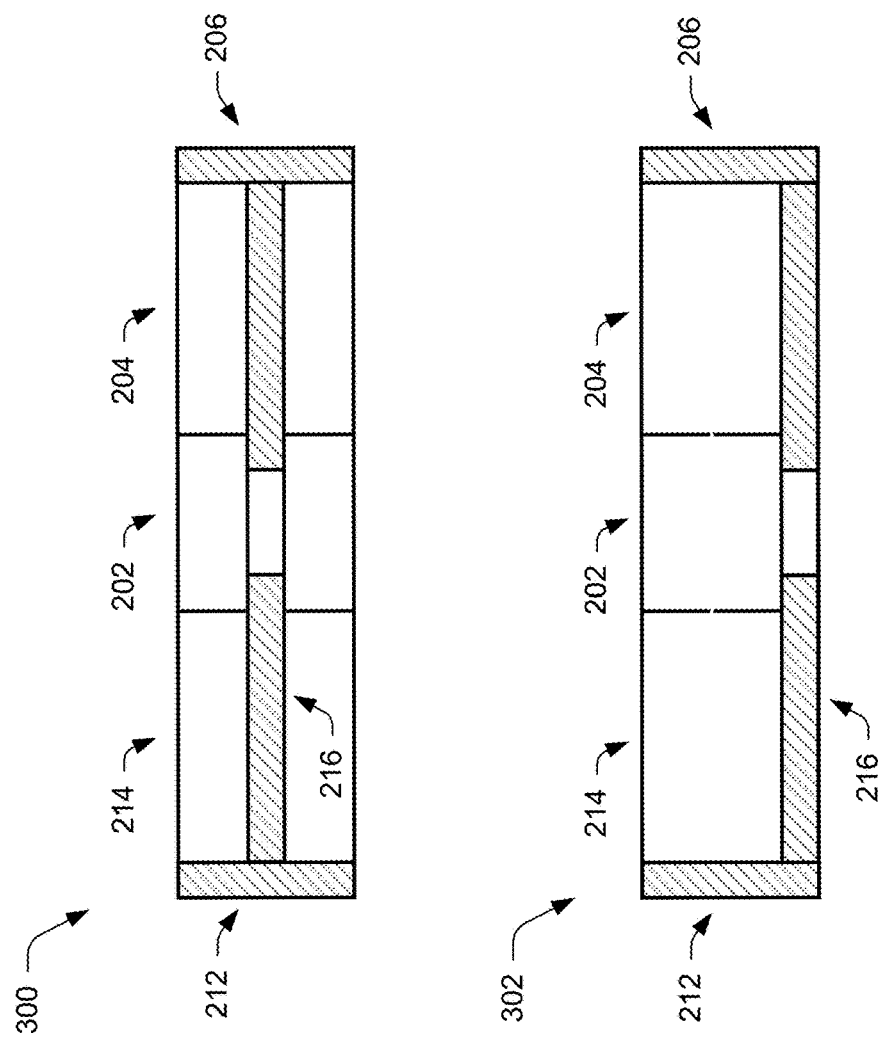
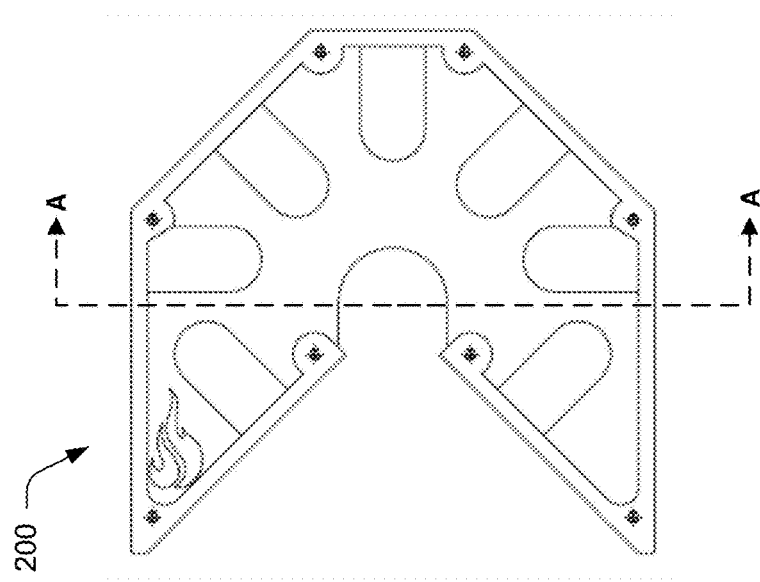
Fig. 3

WORKPIECE TOOLS AND TECHNIQUES

RELATED APPLICATIONS

This application is a continuation-in-part of and claims priority to U.S. patent application Ser. No. 17/666,348, filed Feb. 7, 2022 and entitled "Workpiece-holding tools and Techniques", which is a continuation of and claims priority to U.S. patent application Ser. No. 16/872,133, filed May 11, 2020 and entitled "Workpiece-holding tools and Techniques", which is a continuation of and claims priority to U.S. patent application Ser. No. 15/707,746 filed Sep. 18, 2017 and entitled "Workpiece-holding tools and Techniques", which in turn claims priority to U.S. Provisional Application No. 62/505,941 filed May 14, 2017 and entitled "Adjustable Angle Builders Square", the entire disclosures of which are hereby incorporated by reference herein in their entirety.

BACKGROUND

Welders, carpenters, and other people joining workpieces together often have a need to join the workpieces together at particular angles. A welder, for instance, may frequently need to weld two metal workpieces together at specific angles, such as 90-degrees or 45-degrees. However, a single welder cannot simultaneously hold two or more workpieces himself, align the workpieces to a specific angle, and ensure that the alignment does not change during the welding process.

Conventional tools for aligning workpieces, such as carpentry or speed squares, suffer from numerous limitations that reduce or negate their utility. For example, while a speed square may provide a 90-degree angle, a speed square is substantially planar itself and does not provide flat planar edges on which to properly align workpieces. Further, a speed square lacks the ability to hold workpieces, and both the speed square and the workpiece must be manually held to ensure that an alignment does not change. Due to these limitations, a user of a speed square is often subjected to a time-consuming iterative process of aligning two workpieces with the speed square, removing the speed square, attaching the workpieces to one another, realigning the workpieces with the speed square, adjusting the attachment between the workpieces, and so on.

Further, forming an angle with a conventional tool requires direct placement of the tool in a joint forming the angle. For example, a user attempting to join two workpieces to form a 90-degree angle must place a conventional tool at the point of joinder and directly flush with the workpieces. Such a placement of a tool directly obstructs the ability to operate upon a workpiece at the point of joinder. This is particularly troublesome when the operation involves welding, where the welding implements themselves must occupy an amount of space proximate to the workpieces. Additionally, the point of joinder between workpieces does not always correspond to the intersection of the planes to which the workpieces are aligned. For example, two workpieces may be aligned at an angle of 90-degrees with respect to one another, but attached via a third workpiece that forms a chamfered corner. In scenarios such as these where there is not a single point of joinder corresponding to a desired angle, conventional tools utterly fail and cannot accurately align workpieces.

Thus, conventional tools and techniques lack the ability to quickly and accurately align workpieces in various scenarios, lack the ability to ensure that the alignment does not change during an operation upon a workpiece, and obstruct access to the point of joinder of workpieces.

SUMMARY

Workpiece tools and techniques are described. The tools and techniques are usable to ensure consistent and durable alignment of various workpieces while providing access for performing attachment techniques thereon, which is not possible using conventional tools and techniques.

A workpiece tool, for instance, may include alignment surfaces that are joined to one another and oriented at corresponding specific angles. The workpiece tool includes accessibility cutouts and access spaces that provide a user simultaneous access to points around a joint formed by objects aligned with the alignment surfaces. In this way, the workpiece tool provides accessibility that allows a user to operate upon a workpiece, e.g., as by joining aligned objects together, without interfering or obstructing access to the objects.

Further, the workpiece tool is configured to allow objects to be held or removably affixed to an alignment surface. Holding objects with the workpiece tool ensures that the alignment of objects with an alignment surface does not change during an operation upon a workpiece. The ability to hold objects is enhanced by the inclusion of cutouts that provide increased access to interior surfaces of the workpiece tool, such as to increase the area available for use of clamps or other fastening devices.

An adjustable tool is also described that includes a tool body and a slidable member that is slidable relative to the tool body. The slidable member, for instance, represents a measurement tool that can be used to measure object dimensions. Further, the tool body includes different side panels that are arranged to enable a variety of different usage scenarios such as include different positions of the slidable member relative to an adjacent object and/or surface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is an illustration of cross-section views of example workpiece tools that are operable to employ techniques described herein in accordance with one or more implementations.

DETAILED DESCRIPTION

Overview

Many conventional alignment tools are substantially planar, i.e. flat, and do not provide sufficient surfaces on which to align objects. Further, conventional alignment tools tend to obstruct user access to the objects being aligned, particularly around points of joinder. Additionally, conventional alignment tools lack the ability to hold objects to ensure that the objects are not unintentionally moved. Thus, many conventional alignment tools have been found to be unable to adequately align objects during operation upon a workpiece.

Accordingly, workpiece tools and techniques are described. In one example, a workpiece tool includes multiple side panels that include alignment surfaces that may be utilized to align and/or hold objects. The workpiece tool includes at least one cutout adjacent an alignment surface. The cutout increases the exposed and accessible area of the corresponding alignment surface, thus providing an increased area upon the alignment surface that may be utilized to clamp or otherwise fasten a workpiece to the tool. Further, a single side panel may provide multiple alignment surfaces, for instance an inner alignment surface and an outer alignment surface. By providing an inner alignment surface that is parallel to an outer alignment surface of the same side panel, clamps or other fasteners may be utilized to ensure that alignment and positioning of objects will not be unintentionally altered.

In another example, the workpiece tool includes alignment surfaces that are joined to one another and oriented at corresponding specific angles. Accessibility cutouts and access spaces are provided adjacent the alignment surfaces to provide a user simultaneous access to points around a joint formed by objects aligned with the alignment surfaces. In this way, the workpiece tool provides accessibility that allows a user to operate upon a workpiece, e.g., as by joining aligned objects together, without interfering or obstructing access to the objects.

In the following discussion, example workpiece tools are described that may employ the techniques described herein. Example scenarios are then described in which the example workpiece tools are utilized to align and/or hold example workpieces. Performance of the example scenarios is not limited to the example workpiece tools, and the example workpiece tools are not limited to performance of the example scenarios.

Workpiece Tools

FIGS. 1-7 depict various example workpiece tools that are operable to employ techniques described herein.

Figure 1:
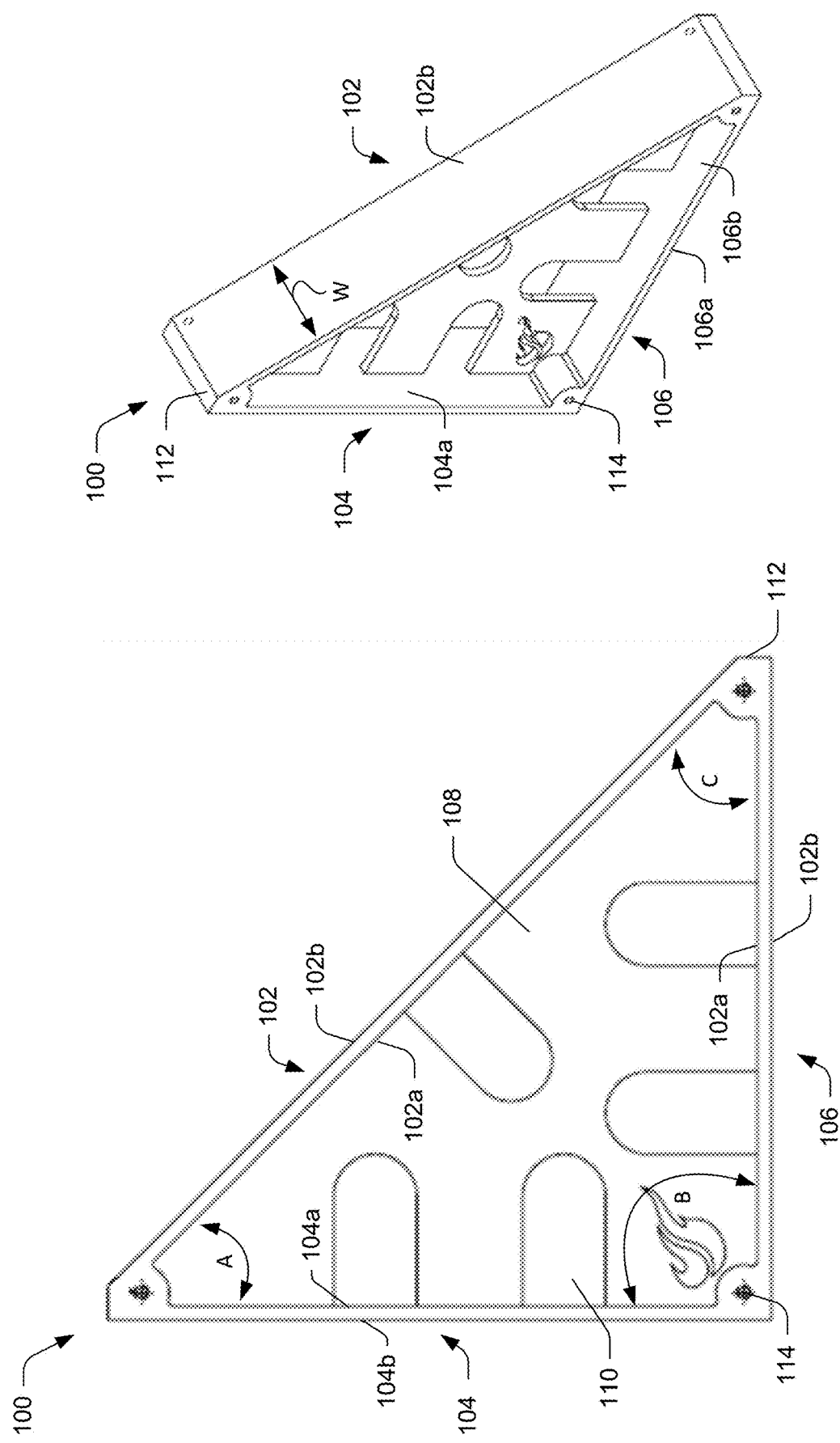
FIG. 1 is an illustration of an example workpiece tool that is operable to employ alignment techniques described herein in accordance with one or more implementations.

FIG. 1 depicts a workpiece tool 100 (shown from two different perspectives) that is operable to employ techniques described herein. The workpiece tool 100 includes side panels 102, 104, and 106. The side panels 102, 104, and 106 each have an interior surface and an exterior surface. For example, the side panel 102 has interior surface 102a and exterior surface 102b. Likewise, the side panel 104 has interior surface 104a and exterior surface 104b, and the side panel 106 has interior surface 106a and exterior surface 106b. The side panels 102, 104, and 106 are each connected by their respective interior surface to a diaphragm 108.

The side panels 102, 104, and 106 of the workpiece tool 100 provide flat surfaces, e.g., the respective interior and exterior surfaces, for aligning, clamping, fastening, holding, or measuring materials or workpieces, and so forth. The side panels 102, 104, and 106 are joined to one another to form respective angles A, B, and C. In the illustrated and described implementation of FIG. 1, side panel 102 and the side panel 104 form an angle A of 45-degrees, the side panel 102 and the side panel 106 form an angle of 45-degrees, side panel 104 and the side panel 106 form an angle B of 90-degrees, and side panel 106 and side panel 102 form an angle C of 45-degrees. Accordingly, workpieces aligned with (e.g., clamped to) adjacent side panels of the workpiece tool 100 will become aligned, one to another, at corresponding specific angles.

The side panels 102, 104, and 106 each have a respective width, illustrated as "W" in the rightmost illustration. The width W is sufficiently large to provide an area upon which nearly any workpiece can become easily aligned with the respective side panel. As an example, the area provided by a side panel is large enough to ensure that a cylindrical workpiece will always contact the side panel at a point of tangency. In some implementations, the side panels have a width W ranging from about 1.5" to about 3", and lengths ranging from about 8" to about 17". Other dimensions can, of course, be used without departing from the spirit and scope of the claimed subject matter.

The diaphragm 108 is a structural support that connects the various side panels and holds angular alignments among the various side panels. In implementations, the diaphragm 108 is connected to at least a part of each respective interior surface of the side panels 102-106. The region generally bounded by the interior surfaces of the side panels 102-106 may be considered an interior region of the workpiece tool 100, and thus the diaphragm 108 is disposed within the interior region. In some implementations, the diaphragm is centered with respect to the width of the side panels as described further with respect to FIG. 3. In other implementations, the diaphragm is aligned to an edge of the side panels with respect to their width as described further with respect to FIG. 3.

The diaphragm 108 includes a plurality of cutouts 110. Each of the cutouts 110 is partially bounded by one of the side panels 102, 104, or 106. The cutouts 110 are passthrough openings for fasteners or clamps, and increase the accessibility to and exposed area of the interior surfaces of the respective side panel. In this way, a clamp or fastener may easily be attached to or access portions of the interior surface along the full width of the respective side panel, without interference from the diaphragm 108. In some implementations, the cutouts have a width ranging from about 1" to about 2" and lengths ranging from about 2" to about 3". The size and shape of each respective cutout may be referred to by its footprint, e.g., a two-dimensional region as seen from a viewpoint perpendicular to the diaphragm 216.

In some implementations, the workpiece tool 100 includes at least one weld relief 112 at the joinder of two side panels. The weld relief 112 is an external cutout that prevents the exterior surfaces of the respective side panels from reaching a point of intersection. The weld relief 112 allows the workpiece tool 100 to be aligned with workpieces despite the presence of deposited weld materials. For example, two workpieces that have been welded to form an acute angle may include a welding bead inside of the acute angle. In such an example, the welding bead obstructs conventional tools from becoming properly aligned with the workpieces, while the workpiece tool 100 with the weld relief 112 is capable of becoming flush with both workpieces and achieving proper alignment.

Further, in some implementations the workpiece tool 100 includes at least one tapped hole 114. The tapped hole 114 allows various attachments to be removably affixed to the workpiece tool 100, as described in greater detail with respect to FIGS. 8 and 9. In some implementations, the tapped hole 114 is a ¼"-20 tapped hole. As illustrated, the tapped hole 114 is parallel to the width of one or more side panels. In some implementations, the workpiece tool 100 includes additional holes, such as holes through a side panel that may be utilized to fasten the workpiece tool 100 to a modular welding table. For example, the workpiece tool 100 may include ⅝" through-holes in the side panels for the purpose of alignment with ⅝" holes in a modular welding table.

In implementations, the workpiece tool 100 is a made from a metal such as steel, iron, or aluminum, however any suitable substance may be utilized such as various metals, woods, plastics, and so forth. In implementations, the workpiece tool 100 is a single solid object created from CNC machining, however any suitable formation technique may be utilized such as 3D printing a single solid object, or by attaching multiple objects together such as by gluing, welding, fastening with screws, and so forth.

Figure 2:
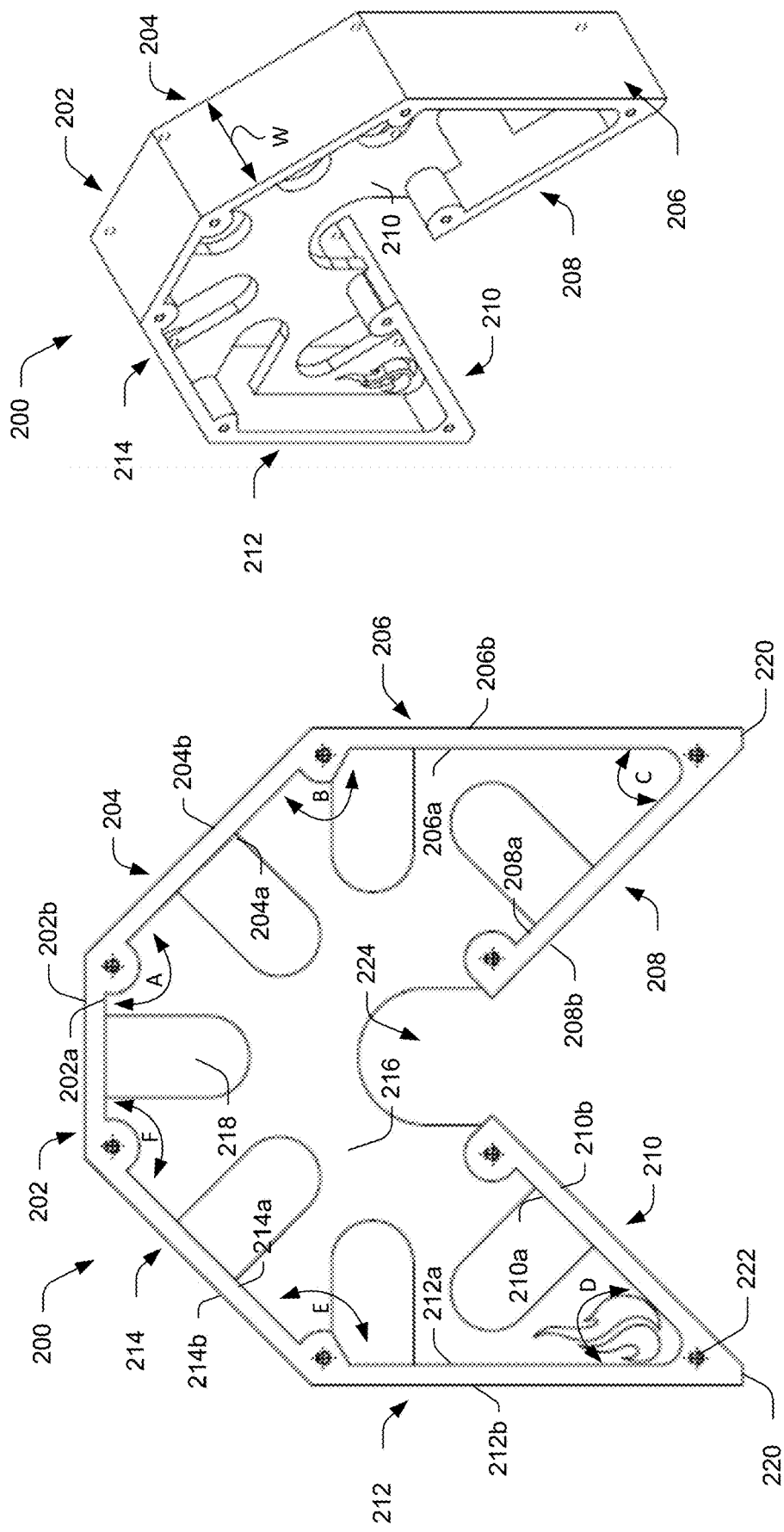
FIG. 2 is an illustration of an example workpiece tool that is operable to employ alignment techniques described herein in accordance with one or more implementations.

FIG. 2 depicts a workpiece tool 200 (shown from two different perspectives) that is operable to employ techniques described herein. The workpiece tool 200 includes side panels 202, 204, 206, 208, 210, 212, and 214. Each of the side panels 202-214 have an interior surface and an exterior surface. For example, the side panel 202 has interior surface 202a and exterior surface 202b. Likewise, the side panel 204 has interior surface 204a and exterior surface 204b, the side panel 206 has interior surface 206a and exterior surface 206b, the side panel 208 has interior surface 208a and exterior surface 208b, the side panel 210 has interior surface 210a and exterior surface 210b, the side panel 212 has interior surface 212a and exterior surface 212b, and the side panel 214 has interior surface 214a and exterior surface 214b. The side panels 202-208 are each connected by their respective interior surface to a diaphragm 216.

The side panels 202-214 of the workpiece tool 200 provide flat surfaces, e.g., the respective interior and exterior surfaces, for aligning, clamping, fastening, holding, or measuring materials or workpieces, and so forth. Each of the side panels 202-214 is joined to at least one other of the side panels 202-214 to form respective angles A, B, C, D, E, and F. In the illustrated and described implementation of FIG. 2, the side panel 202 and the side panel 204 form an angle A of 135-degrees, the side panel 204 and the side panel 206 form an angle B of 135-degrees, the side panel 206 and the side panel 208 form an angle C of 45-degrees, the side panel 210 and the side panel 212 form and angle D of 45-degrees, the side panel 212 and the side panel 214 form an angle E of 135-degrees, and the side panel 214 and the side panel 202 form an angle F of 135-degrees. In such implementations, the side panel 202 is at a right angle with respect to the side panel 206 and the side panel 212, the side panel 204 is at a right angle with respect to the side panel 210 and the side panel 214, and the side panel 214 is at a right angle with respect to the side panel 204 and the side panel 208. Accordingly, workpieces aligned with (e.g., clamped to) adjacent side panels of the workpiece tool 200 will become aligned, one to another, at corresponding specific angles.

The side panels 202-214 each have a respective width, illustrated as "W" in the rightmost illustration. The width W is sufficiently large to provide an area upon which nearly any workpiece can become easily aligned with the respective side panel. As an example, the area provided by a side panel is large enough to ensure that a cylindrical workpiece will always contact the side panel at a point of tangency. In some implementations, the side panels 202-214 have a width W ranging from about 1.5" to about 3", and lengths ranging from about 3.5" to about 12". Other dimensions can, of course, be used without departing from the spirit and scope of the claimed subject matter.

The diaphragm 216 is a structural support that connects the various side panels and holds angular alignments among the various side panels. In implementations, the diaphragm 216 is connected to at least a part of each respective interior surface of the side panels 202-214. The region generally bounded by the interior surfaces of the side panels 202-214 may be considered an interior region of the workpiece tool 200, and thus the diaphragm 216 is disposed within the interior region. In some implementations, the diaphragm is centered with respect to the width of the side panels as described further with respect to FIG. 3. In other implementations, the diaphragm is aligned to an edge of the side panels with respect to their width as described further with respect to FIG. 3.

The diaphragm 216 includes a plurality of cutouts 218. Each of the cutouts 218 is partially bounded by one of the side panels 202-214. The cutouts 218 are pass-through openings for fasteners or clamps, and increase the accessibility to and exposed area of the interior surface of the respective side panel. In this way, a clamp or fastener may easily be attached to or access portions of the interior surface along the full width of the respective side panel, without interference from the diaphragm 216. In some implementations, the cutouts have a width ranging from about 1" to about 2" and lengths ranging from about 2" to about 3". The size and shape of each respective cutout may be referred to by its footprint, e.g., a two-dimensional region as seen from a viewpoint perpendicular to the diaphragm 216.

In some implementations, the workpiece tool 200 includes at least one weld relief 220 at the joinder of two side panels. The weld relief 220 is an external cutout that prevents the exterior surfaces of the respective side panels from reaching a point of intersection. The weld relief 220 allows the workpiece tool 200 to be aligned with workpieces despite the presence of deposited weld materials. For example, two workpieces that have been welded to form an acute angle may include a welding bead inside of the acute angle. In such an example, the welding bead obstructs conventional tools from becoming properly aligned with the workpieces, while the workpiece tool 200 with the weld relief 220 is capable of becoming flush with both workpieces and achieving proper alignment. Further, in some implementations the weld reliefs 220 may provide aligned surfaces similar to a side panel. The weld reliefs 220 depicted in FIG. 2 provide aligned surfaces on a plane that is parallel to the side panel 202.

Further, in some implementations the workpiece tool 200 includes at least one tapped hole 222. The tapped hole 222 allows various attachments to be removably affixed to the workpiece tool 200, as described in greater detail with respect to FIGS. 8 and 9. In some implementations, the tapped hole 222 is a ¼"-20 tapped hole. As illustrated, the tapped hole 222 is parallel to the width of one or more side panels. In some implementations, the workpiece tool 200 includes additional holes, such as holes through a side panel that may be utilized to fasten the workpiece tool 200 to a modular welding table. For example, the workpiece tool 200 may include ⅝" through-holes in the side panels for the purpose of alignment with ⅝" holes in a modular welding table.

The workpiece tool 200 further includes a master cutout 224. The master cutout 224 is partially bounded by the diaphragm 216 and is generally unbounded by any of the side panels 202-214. The master cutout 224 is an opening that provides accessibility for joining workpieces displaced within or proximate to the master cutout 224, as described in greater detail with respect to FIGS. 5, 12, and 13. In some implementations, the master cutout 224 has a radius ranging from about 0.5" to about 2". The size and shape of the master cutout 224 may be referred to by its footprint, e.g., a two-dimensional region as seen from a viewpoint perpendicular to the diaphragm 216. In some implementations, the footprint of the master cutout 224 is larger than the footprint of any other cutout, e.g. the cutouts 218.

The workpiece tool 200 is balanced such that the workpiece tool 200 can stand on any one of the side panels 202, 204, 206, 212, 214, or on the weld reliefs 220. In implementations, the workpiece tool 200 is a made from a metal such as steel, iron, or aluminum, however any suitable substance may be utilized such as various metals, woods, plastics, and so forth. In implementations, the workpiece tool 200 is a single solid object created from CNC machining, however any suitable formation technique may be utilized such as 3D printing a single solid object, or by attaching multiple objects together such as by gluing, welding, fastening with screws, and so forth.

FIG. 3 depicts implementations of the workpiece tool 200, including two alternate implementations taken along line A-A. The diaphragm 216 is oriented to be orthogonal to each of the side panels 202-214. In some implementations, the diaphragm is centered with respect to the width of the side panels as depicted in the cutout perspective 300. In other implementations, the diaphragm is aligned to an edge of the side panels with respect to their width as depicted in the cutout perspective 302.

Figure 4:
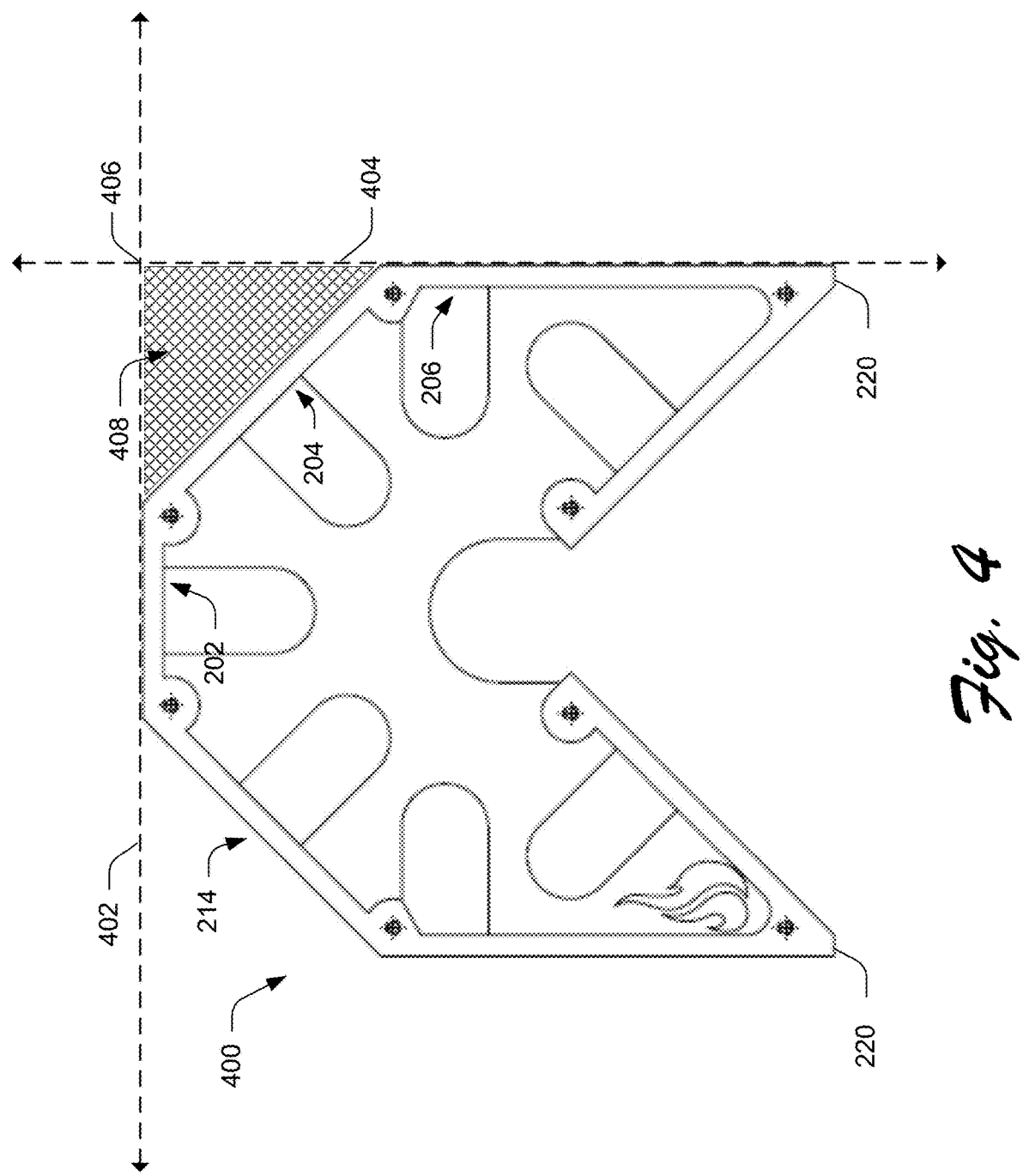
FIG. 4 is an illustration of alignment planes formed by surfaces of an example workpiece tool that is operable to employ techniques described herein in accordance with one or more implementations.

FIG. 4 depicts a workpiece tool 400 in accordance with one or more implementations. The workpiece tool 400 may be, for example, the workpiece tool 200 of FIG. 2. Planes 402 and 404 extend into and out of the page upon which FIG. 4 appears, and are aligned with two side panels of the workpiece tool 400. In the illustrated and described implementation of FIG. 4, plane 402 is aligned with side panel 202, and plane 404 is aligned with side panel 206. The planes 402 and 404 are depicted with dotted lines, and continue infinitely as indicated by arrows at the ends of the depicted lines. The planes 402 and 404 intersect at a point 406. The area generally bounded by the plane 402, the plane 404, and the side panel 204 corresponds to an access space 408.

The access space 408 provides accessibility for joining workpieces that are located proximate to the planes 402 and/or 404, or to workpieces located within the access space 408 itself. For example, if substantially straight workpieces are aligned with the side panels 202 and 206, respectively, they are also aligned with the planes 402 and 404, respectively, and may form a joint at the point 406. In such an example, a user has unobstructed access to the access space 408. By virtue of the access space 408, the user may operate upon the workpiece at any portion of the joint formed at the point 406, including on portions of the joint that are only accessible via the access space 408.

The workpiece tool 400 includes a plurality of access spaces, however for visual clarity only a single access space 408 is expressly depicted. The access spaces may vary in size and/or shape. In implementations, there is an access space adjacent to each of the side panels 202, 204, 206, 212, and 214. For instance, an access space adjacent to side panel 202 is generally bounded by the side panel 202 and by planes aligned with the side panels 204 and 214. In the illustrated and described implementation of FIG. 4, the access space adjacent to side panel 202 is smaller than the access space 408 that is adjacent to side panel 204. As another example, an access space adjacent to the side panel 206 is generally bounded by the side panel 206, a plane aligned with the side panel 204, and a plane aligned with the weld reliefs 220. In the illustrated and described implementation of FIG. 4, the access space adjacent to side panel 206 is smaller than the access space 408 that is adjacent to side panel 204. In this way, the workpiece tool 400 provides various access spaces of differing shapes and sizes. The access spaces may be utilized not only for direct access to the region, but may also be utilized to align objects despite obstructions proximate to the access space. For instance, the objects forming a joint near the point 406 may include a welding bead other protrusion that extends into the access space 408. The access space 408 allows the objects to be aligned with the side panels 202 and 206 despite the protrusion, whereas a conventional tool would be unable to align the objects.

Figure 5:
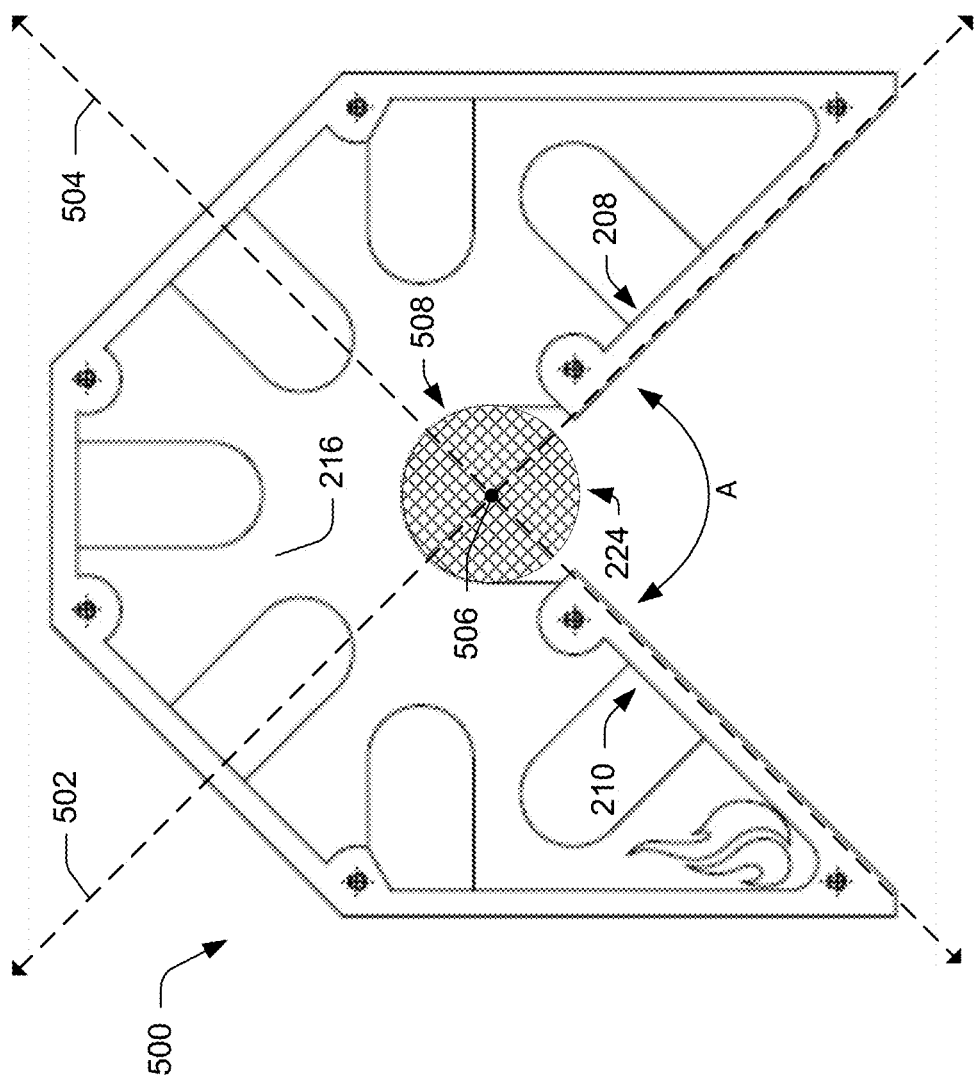
FIG. 5 is an illustration of cutouts in relation to alignment planes formed by surfaces of an example workpiece tool that is operable to employ techniques described herein in accordance with one or more implementations.

FIG. 5 depicts a workpiece tool 500 that is operable to employ techniques described herein. The workpiece tool 500 may be, for example, the workpiece tool 200 of FIG. 2. The diaphragm 216 is aligned with a reference plane that extends along the page upon which FIG. 5 appears. The side panel 208 is aligned with a plane 502, and the side panel 210 is aligned with a second plane 504. The first plane 502 and the second plane 504 are depicted with dotted lines, extend into and out of the page upon which FIG. 5 appears, and continue infinitely as indicated by arrows at the ends of the depicted lines. In the illustrated and described implementation of FIG. 5, the reference plane, the first plane 502, and the second plane 504 are orthogonal planes, and thus the diaphragm 216, the side panel 208, and the side panel 210 are orthogonal to one another.

The workpiece tool 500 further includes a master cutout 224. The master cutout 224 is partially bounded by the diaphragm 216 and is generally unbounded by the side panels 208 and 210. The master cutout 224 is an opening that generally extends from a point 506 that is the intersection of the planes 502 and 504. In the illustrated and described implementation of FIG. 5, the master cutout 224 is generally circular in shape extending a radius from the point 506, as depicted by the circular region 508. The side panels 208 and 210 each include a cutout that extends a distance from the point 506 that is greater than the radius of the circular region 508.

Figure 6:
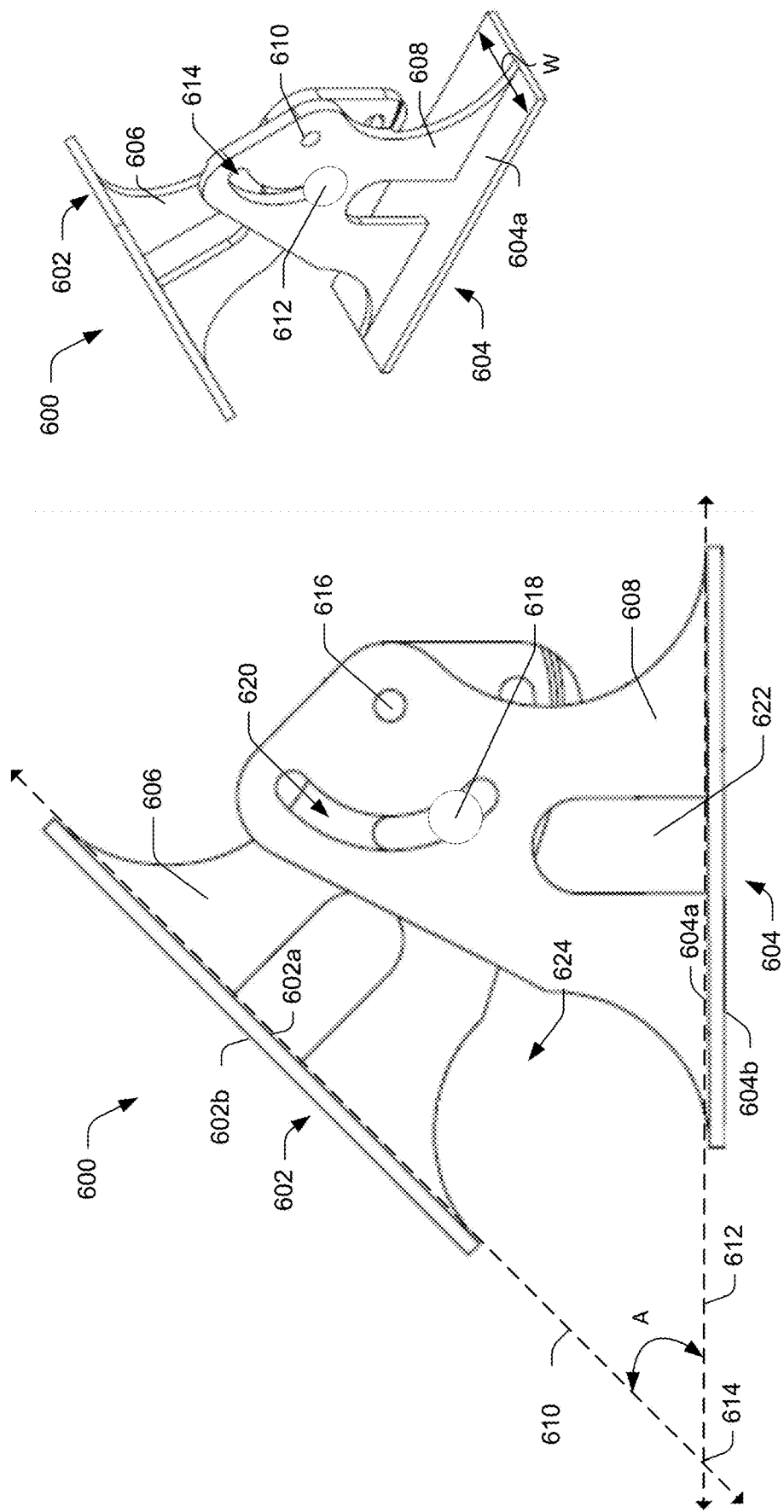
FIG. 6 is an illustration of an example workpiece tool that is operable to employ techniques described herein in accordance with one or more implementations.

FIG. 6 depicts a workpiece tool 600 (shown from two different perspectives) that is operable to employ techniques described herein. The workpiece tool 600 includes side panels 602 and 604. The side panels 602 and 604 each have an interior surface and an exterior surface. For example, the side panel 602 has interior surface 602a and exterior surface 602b. Likewise, the side panel 604 has interior surface 604a and exterior surface 604b. The side panel 602 is connected by the interior surface 602a to a diaphragm 606, and the side panel 604 is connected by the interior surface 604a to a diaphragm 608.

The side panels 602 and 604 of the workpiece tool 600 provide flat surfaces, e.g., the respective interior and exterior surfaces, for aligning, clamping, fastening, holding, or measuring materials or workpieces, and so forth. The side panels 602 and 604 form an angle A in relation to one another. The angle A is not a fixed angle, and in the illustrated and described implementation of FIG. 6, the angle A can be varied up to about 100-degrees. The side panel 602 and the side panel 604 do not contact one another, and the angle A may be conceptualized based on planes aligned with the side panel 602 and the side panel 604. In the illustrated and described implementation of FIG. 6, the side panel 602 is aligned with a plane 610 and the side panel 604 is aligned with a plane 612. The planes 610 and 612 are depicted as dotted lines and extend into and out of the page upon which FIG. 6 appears, and continue infinitely as indicated by arrows at the ends of the depicted lines. The planes 610 and 612 intersect at a point 614, which is consider as a point forming the angle A.

Accordingly, workpieces aligned with (e.g., clamped to) the side panels 602 and 604 will become aligned, one to another, at a specific yet variable angle A. The side panels 602 and 604 each have a respective width, illustrated as "W" in the rightmost illustration. The width W is sufficiently large to provide an area upon which nearly any workpiece can become easily aligned with the respective side panel. As an example, the area provided by a side panel is large enough to ensure that a cylindrical workpiece will always contact the side panel at a point of tangency. In some implementations, the side panels have a width W ranging from about 1.5" to about 3", and lengths ranging from about 6" to about 12". Other dimensions can, of course, be used without departing from the spirit and scope of the claimed subject matter.

The diaphragms 606 and 608 are structural supports that connect the side panels 602 and 604. The diaphragm 606 and the diaphragm 608 are connected via a hinge 616. The hinge 616 is offset a distance from the point 614, which allows the angle A to be varied without obstructing access to objects located at point 614. The diaphragms 606 and 608 may freely pivot around the hinge 616, subject to a hinge constraint 618. In implementations, the hinge constraint 618 is received within a corresponding slot 620. Motion of the workpiece tool 600 around the hinge is described in greater detail with respect to FIG. 7.

The hinge constraint 618 may be any mechanism that is capable of locking the hinge in place, thereby fixing the side panels at a specific angle. For example, in some implementations the hinge constraint 618 includes a nut and bolt placed through a slot 620 in each of the diaphragms 606 and 608, capable of squeezing the diaphragms 606 and 608 together when the nut is tightened. In other implementations, the hinge constraint 618 may be included as a part of the hinge 616 itself. When the hinge constraint 618 is activated to lock the hinge in place, the side panels 602 and 604 are held at a particular angular alignment. In some implementations, the workpiece tool 600 may include markings or indicators that designate the angle created by a current position of the hinge 616.

The diaphragms 606 and 608 are generally centered with respect to the width of the side panels. However, due to the split diaphragm of the workpiece tool 600, the diaphragms 606 and 608 occupy parallel adjacent planes and may cause a sideways displacement with respect to the width of the side panels. In some implementations, one or both of the diaphragms 606 and 608 are offset from center to compensate for this displacement and to maintain alignment of the side panels 602 and 604.

The diaphragms 606 and/or 608 may each include a plurality of cutouts 622. Each of the cutouts 622 is partially bounded by one of the side panels 602 or 604. The cutouts 622 are pass-through openings for fasteners or clamps, and increase the accessibility to and exposed area of the interior surface of each respective side panel. In this way, a clamp or fastener may easily be attached to or access portions of the interior surface along the full width of the respective side panel, without interference from the respective one of diaphragms 606 or 608. In some implementations, the cutouts have a width ranging from about 1" to about 2" and lengths ranging from about 2" to about 3". The size and shape of each respective cutout may be referred to by its footprint, e.g., a two-dimensional region as seen from a viewpoint perpendicular to the diaphragm 216.

The workpiece tool 600 further includes a master cutout 624. The master cutout 624 is partially bounded by the diaphragms 606 and 608, and is generally unbounded by the side panels 602 and 604. The master cutout 624 is an opening that provides accessibility for joining workpieces displaced within or proximate to the master cutout 624, as described in greater detail with respect to FIGS. 14 and 15.

In implementations, the workpiece tool 600 is a made from a metal such as steel, iron, or aluminum, however any suitable substance may be utilized such as various metals, woods, plastics, and so forth. In implementations, each component including a side panel and a diaphragm (e.g. the side panel 602 and the diaphragm 606, or the side panel 604 and the diaphragm 608) is a single solid object created from CNC machining, however any suitable formation technique may be utilized such as 3D printing a single solid object, or by attaching multiple objects together such as by gluing, welding, fastening with screws, and so forth.

Figure 7:
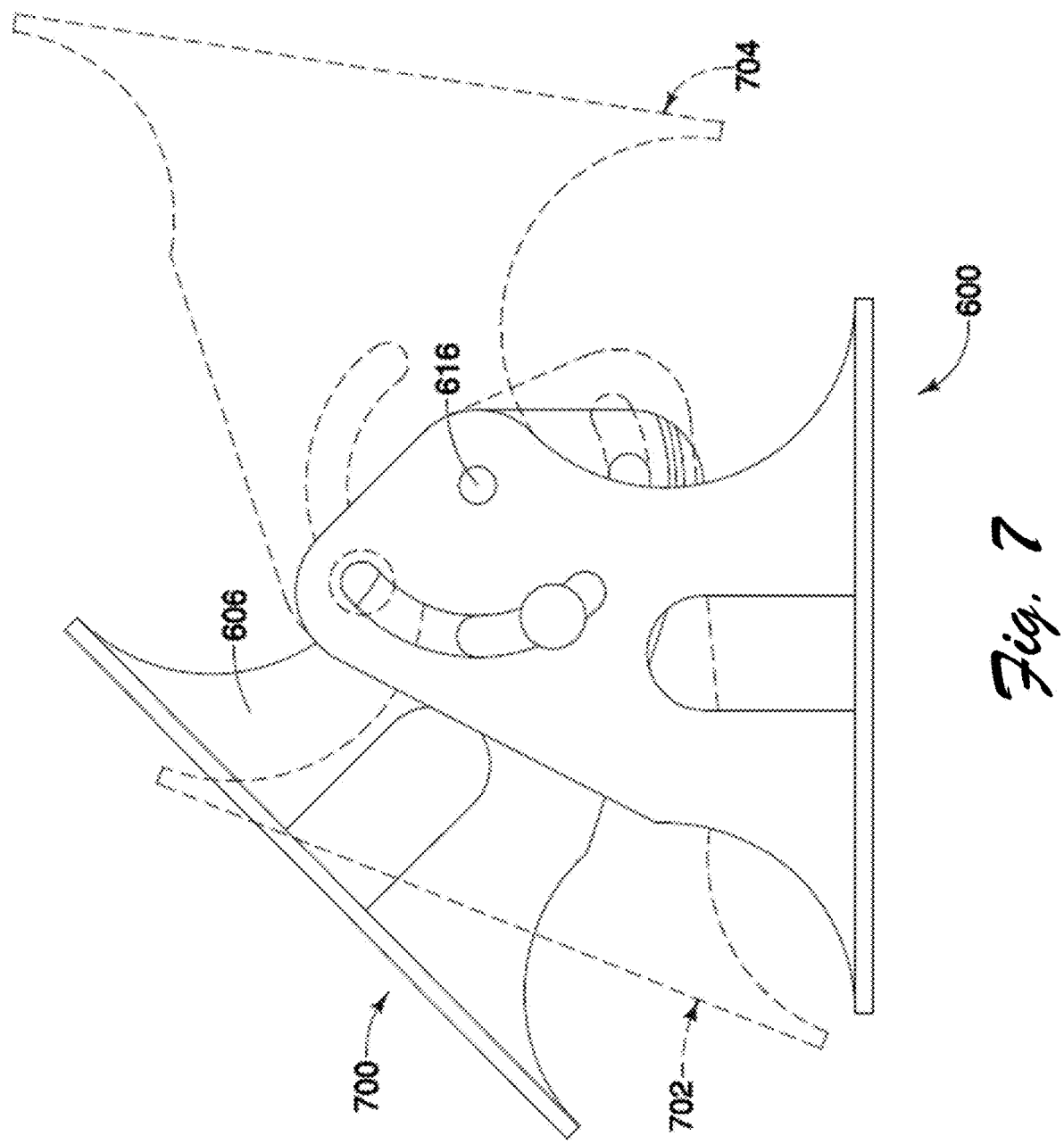
FIG. 7 is an illustration of exemplary physical states of an example workpiece tool that is operable to employ techniques described herein in accordance with one or more implementations.

FIG. 7 depicts the workpiece tool 600, depicted with solid lines in a first state 700. As the diaphragm 606 rotates about the hinge 616, the angle formed by the side panels changes. The diaphragm 606 may be rotated to alter the alignment of the side panels with respect to one another. Dashed lines depicting a second state 702 illustrate the diaphragm 606 having been rotated to increase the interior angle formed by the side panels. Since the hinge 616 is an offset hinge that is not located proximate either of the planes forming the angle, the side panels are parallel with a fixed displacement when the angle is 0-degrees. When the diaphragm 606 is rotated beyond 0-degrees, the angle is formed on the opposite side of the workpiece tool 600, as depicted by dashed lines in a third state 704. Thus, the workpiece tool 600 is capable of forming angles on the left side of the device (e.g., states 700 and 702) such that the intersection of planes of the side panels occurs at a point located to the left of the hinge, and is also capable of forming angles on the right side of the device (e.g., state 704) such that the intersection of planes of the side panels occurs at a point located to the right of the hinge. In some implementations, the workpiece tool 600 can form an interior angle that varies anywhere from about 100-degrees on the left side to about 100-degrees on the right side.

Figure 8:
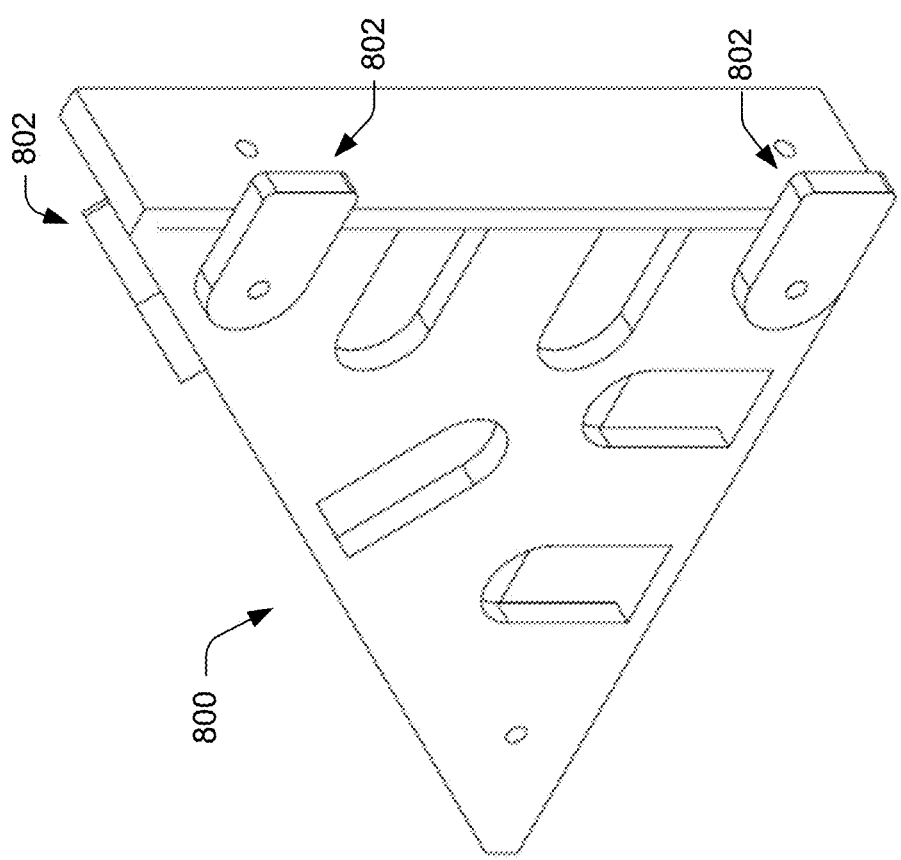
FIG. 8 is an illustration of an example workpiece tool that has been modified to include various alignment attachments in accordance with one or more implementations.

FIG. 8 depicts an example scenario in which a workpiece tool 800 is modified to include various attachments 802. The attachments 802 may be any implement capable of assisting in the alignment of workpieces with respect to the workpiece tool 800. The attachments 802 may, for instance, be affixed to the workpiece tool 800 by inserting a screw through the attachments 802 and into tapped holes located in the workpiece tool 800. In this scenario, the attachments 802 are depicted as flat tabs. By attaching the tabs to the workpiece tool 800, additional contact areas are created that provide additional or alternative planes with which to align workpieces. As an example, the workpiece tool 800 may be placed on a flat surface, forming a 90-degree angle between the flat surface and a side panel of the workpiece tool 800. In such an example, the addition of the attachments 802 perpendicular to a side panel provides a third, orthogonal contact surface, allowing any workpiece to be quickly oriented against three orthogonal surfaces.

Figure 9:
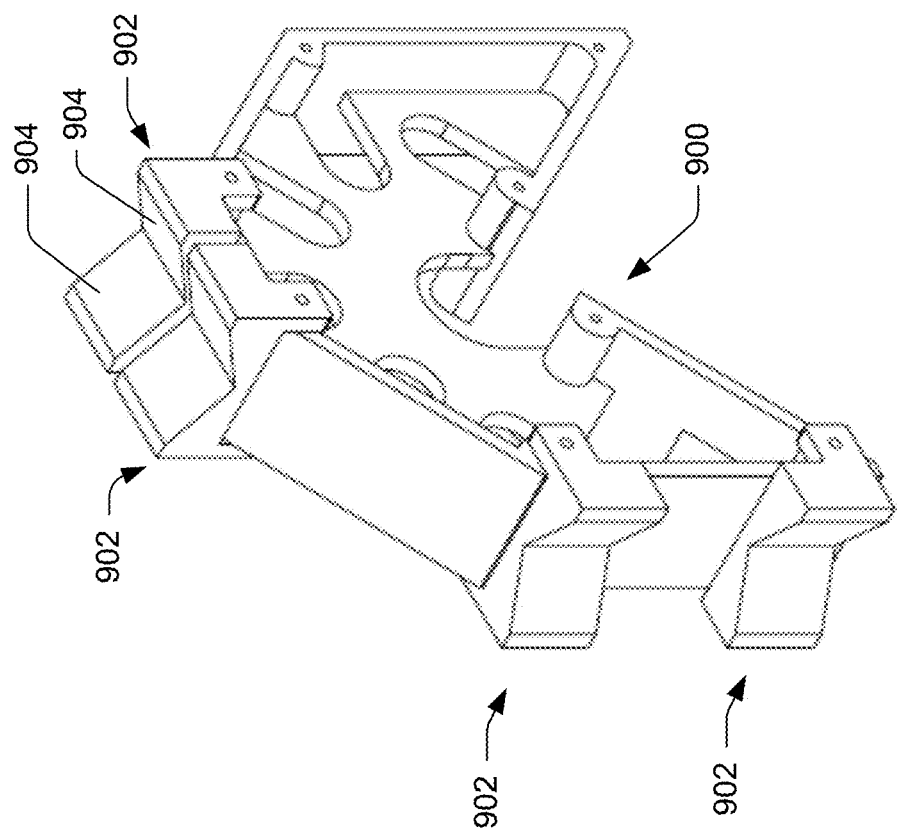
FIG. 9 is an illustration of an example workpiece tool that has been modified to include various alignment attachments in accordance with one or more implementations.

FIG. 9 depicts an example scenario in which a workpiece tool 900 is modified to include various attachments 902. The attachments 902 may be any implement capable of assisting in the alignment of workpieces with respect to the workpiece tool 900. The attachments 902 may, for instance, be affixed to the workpiece tool 900 by inserting a screw through the attachments 902 and into tapped holes located in the workpiece tool 900. In this scenario, the attachments 902 are depicted as blocks with a 'V' shaped notch. The notch in this example is centered with respect to the width of the side panels of the workpiece tool 900, such that flat surfaces extend in equal but opposite directions from a central deepest point of the notch. By adding the blocks to the workpiece tool 900, additional contact areas (e.g., contact areas 904) are created that provide additional or alternative planes with which to align workpieces. For example, a cylindrical workpiece may be placed into the notches of one or more blocks, becoming aligned with the central point of the notch. In such an example, the addition of the attachments 902 allows a cylindrical workpiece (a shape that is generally difficult to align using conventional tools) to be quickly and easily aligned not only with the plane of a side panel of the workpiece tool 900, but also with the plane of a diaphragm of the workpiece tool 900.

Figure 10:
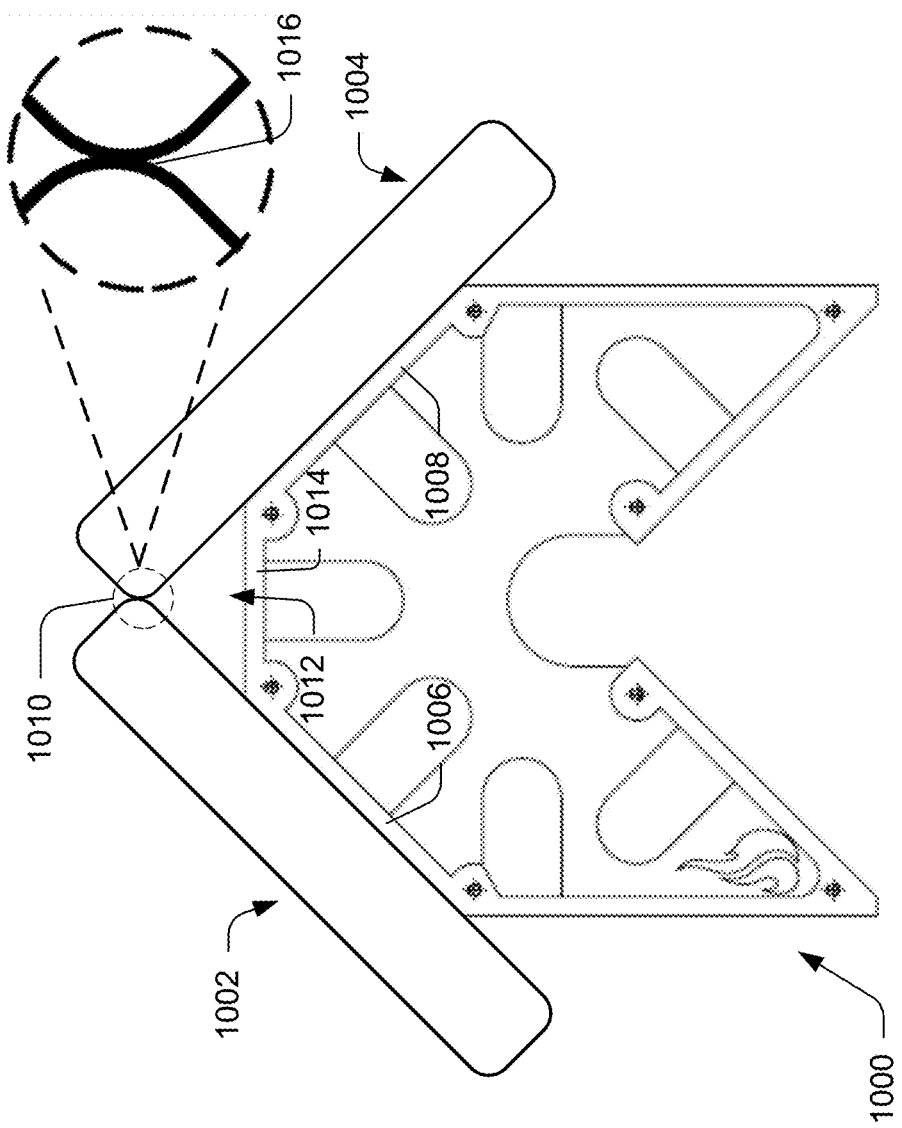
FIG. 10 is an illustration of an example scenario in which two workpieces are aligned at a specific angle through use of an example workpiece tool in accordance with one or more implementations.

FIG. 10 depicts an example scenario in which a workpiece tool 1000 is utilized to align two workpieces 1002 and 1004. The workpiece tool 1000 may be, for example, the workpiece tool 200 of FIG. 2. The workpiece tool 1000 includes a first side panel 1006 and a second side panel 1008. The side panels 1006 and 1008 are perpendicular to one another, but do not intersect or contact each other. The workpiece 1002 is aligned with the first side panel 1006, and the workpiece 1004 is aligned with the second side panel 1008. Accordingly, the workpieces 1002 and 1004 are aligned perpendicular to one another and intersect in a region 1010. However, since the side panels 1006 and 1008 do not intersect but the workpieces 1002 and 1004 do intersect, an access space 1012 is formed between a side panel 1014 and the workpieces 1002 and 1004. The access space 1012 provides access to the inside intersection 1016 of the workpieces 1002 and 1004. This access may be utilized, for example, to insert welding equipment into the access space 1012 and perform welding techniques on the inside intersection 1016 of the joint formed by workpieces 1002 and 1004. Accordingly, a single configuration is capable of providing simultaneous access to all points in proximity to the intersection of workpieces 1002 and 1004.

Optionally, the workpieces 1002 and 1004 may be clamped or otherwise fastened to the side panels 1006 and 1008, respectively. For example, workpiece 1002 may be clamped to the side panel 1006 by affixing a clamping device to an exterior surface of the workpiece 1002 and to the interior surface of the side panel 1006. Likewise, workpiece 1004 may be clamped to the side panel 1008 by affixing a clamping device to an exterior surface of the workpiece 1004 and to the interior surface of the side panel 1008. In some implementations, a portion of a clamp is passed through a cutout in the workpiece tool 1000.

Figure 11:
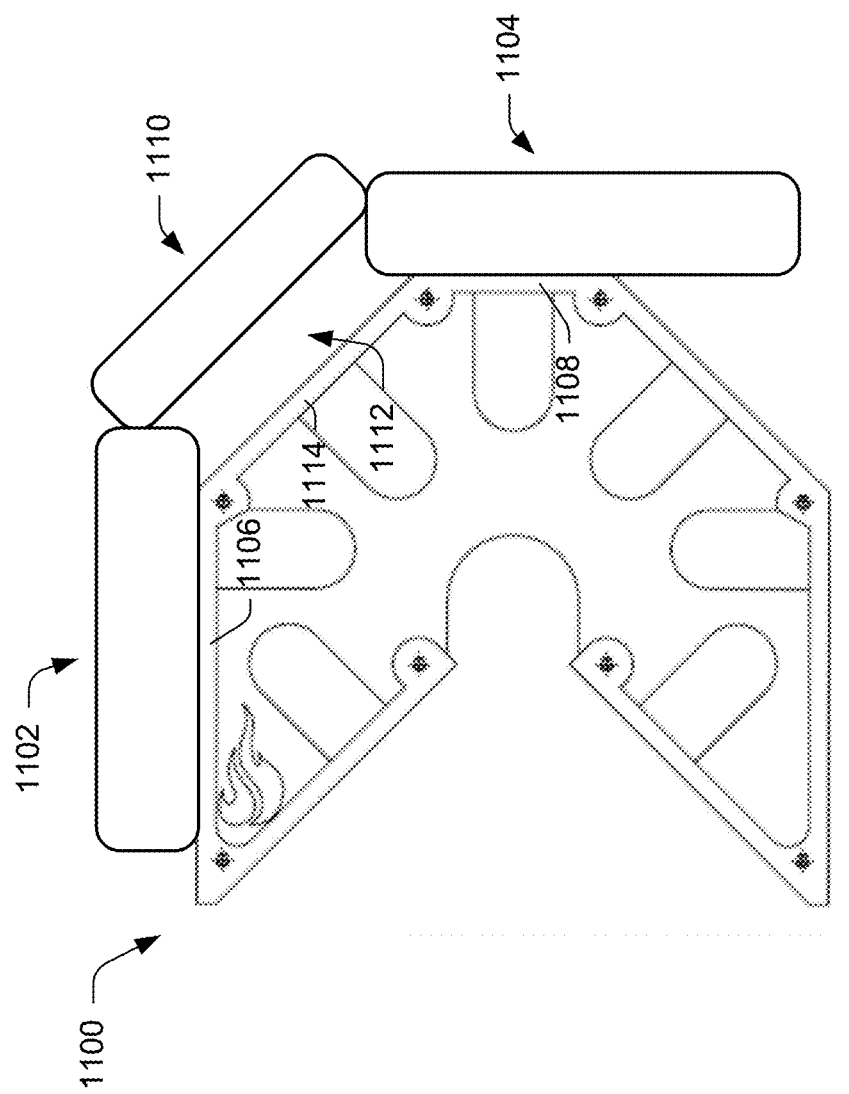
FIG. 11 is an illustration of an example scenario in which workpieces are aligned at specific angles through use of an example workpiece tool in accordance with one or more implementations.

FIG. 11 depicts an example scenario in which a workpiece tool 1100 is utilized to align two workpieces 1102 and 1104. The workpiece tool 1100 may be, for example, the workpiece tool 200 of FIG. 2. The workpiece tool 1100 includes a first side panel 1106 and a second side panel 1108. The side panels 1106 and 1108 are perpendicular to one another, but do not intersect or contact each other. The workpiece 1102 is aligned with the first side panel 1106, and the workpiece 1104 is aligned with the second side panel 1108. Accordingly, the workpieces 1102 and 1104 are aligned perpendicular to one another. However, the workpieces 1102 and 1104 do not intersect and are instead connected indirectly via a workpiece 1110. Despite the lack of direct contact between workpieces 1102 and 1104, their alignment with the workpiece tool 1100 ensures that the workpieces 1102 and 1104 remain at an angle of 90-degrees with respect to each other, regardless of a positioning or orientation of the workpiece 1110. The workpiece 1110 may obstruct, collide, or overlap with the intersection of planes formed by the side panels 1106 and 1108, and thus a conventional tool is unable to function in this scenario.

Further, an access space 1112 is formed between a side panel 1114 of the workpiece tool 1100, the first workpiece 1102, the second workpiece 1104, and the third workpiece 1110. The access space 1112 provides access to the inside intersection between workpieces 1102 and 1110, and the inside intersection between workpieces 1104 and 1110. This access may be utilized, for example, to insert welding equipment and perform welding techniques on the interior joints formed by the workpieces 1102, 1104, and 1110. Accordingly, a single configuration is capable of providing simultaneous access to all points in proximity to the intersections of workpieces 1102, 1104, and 1110.

Optionally, the workpieces 1102 and 1104 may be clamped or otherwise fastened to the side panels 1106 and 1108, respectively. For example, workpiece 1102 may be clamped to the side panel 1106 by affixing a clamping device to an exterior surface of the workpiece 1102 and to the interior surface of the side panel 1106. Likewise, workpiece 1104 may be clamped to the side panel 1108 by affixing a clamping device to an exterior surface of the workpiece 1104 and to the interior surface of the side panel 1108. In some implementations, a portion of a clamp is passed through a cutout in the workpiece tool 1100.

Figure 12:
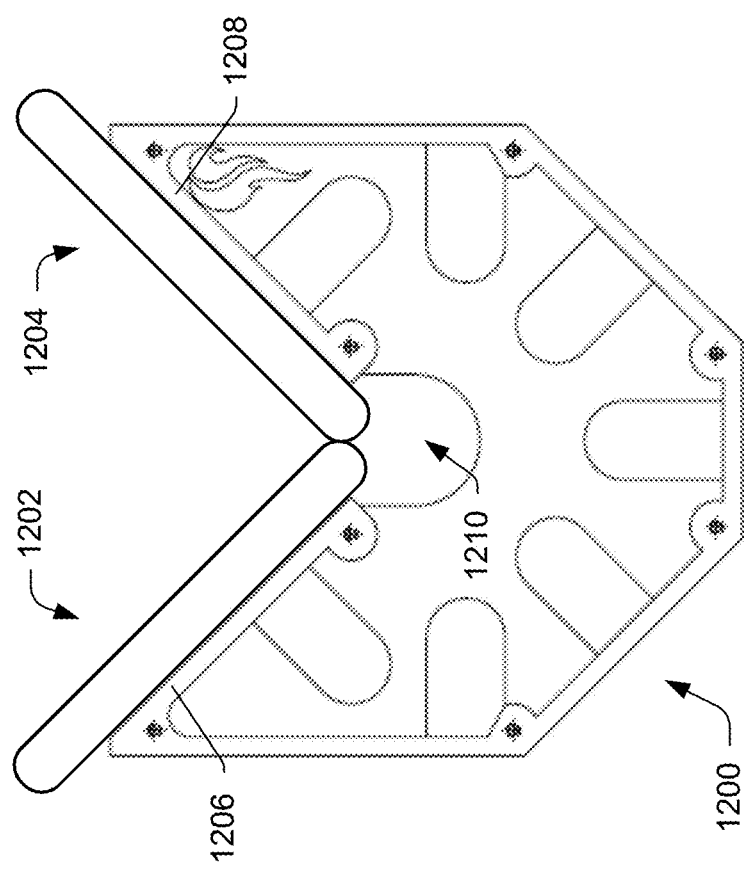
FIG. 12 is an illustration of an example scenario in which two workpieces are aligned at a specific angle through use of an example workpiece tool in accordance with one or more implementations.

FIG. 12 depicts an example scenario in which a workpiece tool 1200 is utilized to align two workpieces 1202 and 1204. The workpiece tool 1200 may be, for example, the workpiece tool 200 of FIG. 2. The workpiece tool 1200 includes a first side panel 1206 and a second side panel 1208. The side panels 1206 and 1208 are perpendicular to one another, but do not intersect or contact each other. Each of the side panels 1206 and 1208 has an interior surface and an exterior surface. The workpiece 1202 is aligned with the exterior surface of the first side panel 1206, and the workpiece 1204 is aligned with the exterior surface of the second side panel 1208. Accordingly, the workpieces 1202 and 1204 are aligned perpendicular to one another. The workpiece tool 1200 further includes a master cutout 1210. The master cutout 1210 provides access to an exterior joint formed by the workpieces 1202 and 1204. This access may be utilized, for example, to insert welding equipment and perform welding techniques on the exterior joint formed by workpieces 1202 and 1204. Accordingly, a single configuration is capable of providing simultaneous access to all points in proximity to the intersection of workpieces 1202 and 1204.

Optionally, the workpieces 1202 and 1204 may be clamped or otherwise fastened to the side panels 1206 and 1208, respectively. For example, workpiece 1202 may be clamped to the side panel 1206 by affixing a clamping device to an exterior surface of the workpiece 1202 and to the interior surface of the side panel 1206. Likewise, workpiece 1204 may be clamped to the side panel 1208 by affixing a clamping device to an exterior surface of the workpiece 1204 and to the interior surface of the side panel 1208. In some implementations, a portion of a clamp is passed through a cutout in the workpiece tool 1200.

Figure 13:
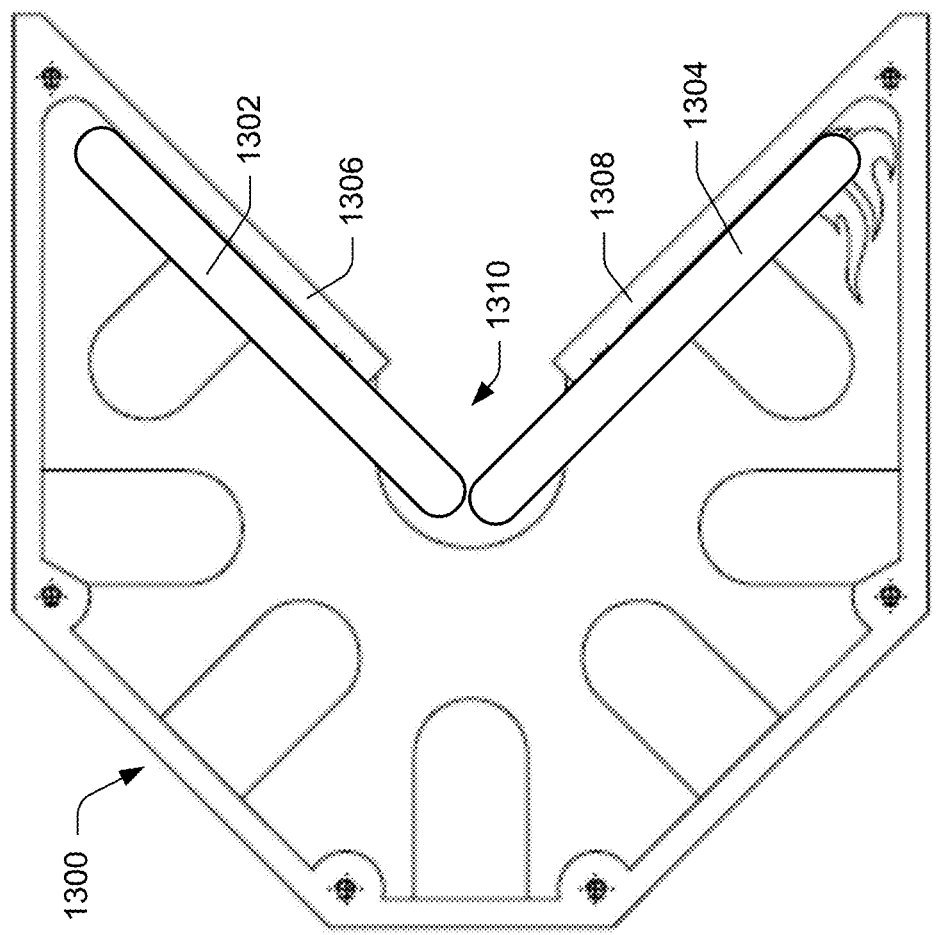
FIG. 13 is an illustration of an example scenario in which two workpieces are aligned at a specific angle through use of an example workpiece tool in accordance with one or more implementations.

FIG. 13 depicts an example scenario in which a workpiece tool 1300 is utilized to align two workpieces 1302 and 1304. The workpiece tool 1300 may be, for example, the workpiece tool 200 of FIG. 2. The workpiece tool 1300 includes a first side panel 1306 and a second side panel 1308. The side panels 1306 and 1308 are perpendicular to one another, but do not intersect or contact each other. Each of the side panels 1306 and 1308 has an interior surface and an exterior surface. The workpiece 1302 is aligned with the interior surface of the first side panel 1306, and the workpiece 1304 is aligned with the interior surface of the second side panel 1308. Accordingly, the workpieces 1302 and 1304 are aligned perpendicular to one another. In some implementations, when a workpiece is aligned with the interior surface of a side panel, the workpiece may additionally be aligned with the diaphragm.

The workpiece tool 1300 further includes a master cutout 1310. The master cutout 1310 provides access to both interior and exterior joints formed by the workpieces 1302 and 1304. This access may be utilized, for example, to insert welding equipment and perform welding techniques on the interior and/or exterior joints formed by workpieces 1302 and 1304. Accordingly, a single configuration is capable of providing simultaneous access to all points in proximity to the intersection of workpieces 1302 and 1304.

Optionally, the workpieces 1302 and 1304 may be clamped or otherwise fastened to the side panels 1306 and 1308, respectively. For example, workpiece 1302 may be clamped to the side panel 1306 by affixing a clamping device to an interior surface of the workpiece 1302 and to the exterior surface of the side panel 1306. Likewise, workpiece 1304 may be clamped to the side panel 1308 by affixing a clamping device to an interior surface of the workpiece 1304 and to the exterior surface of the side panel 1308. In some implementations, a portion of a clamp is passed through a cutout in the workpiece tool 1300.

Figure 14:
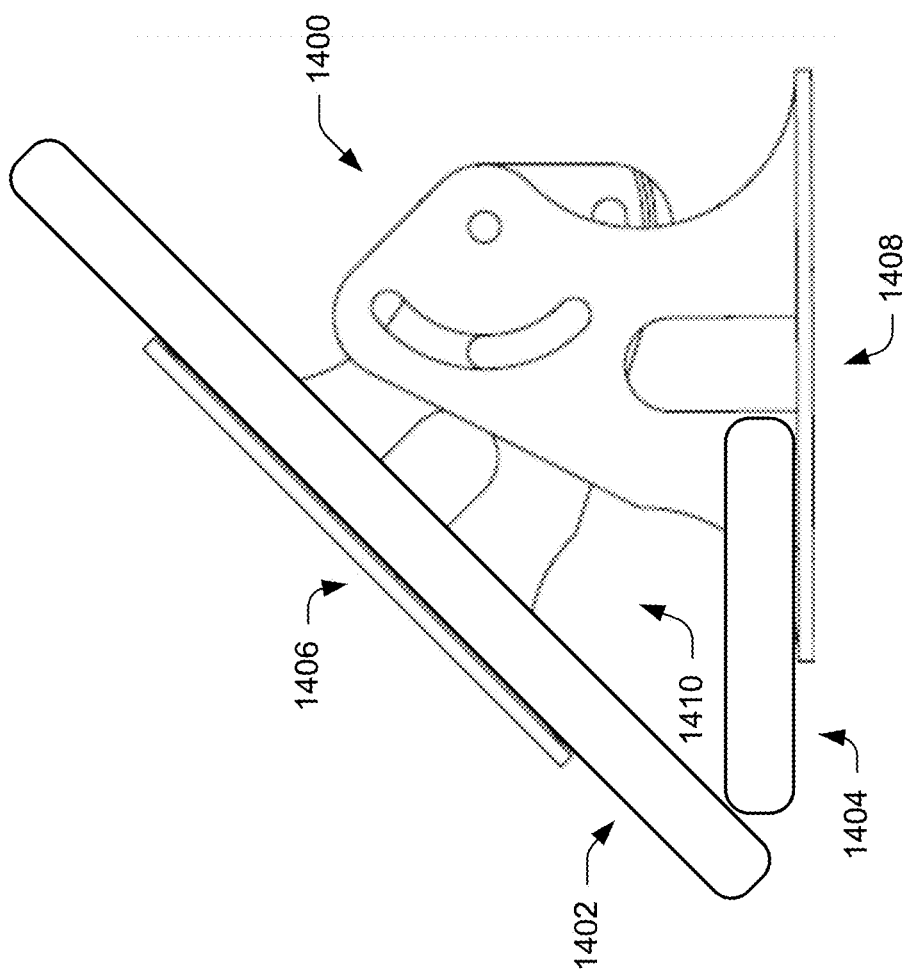
FIG. 14 is an illustration of an example scenario in which two workpieces are aligned at a specific angle through use of an example workpiece tool in accordance with one or more implementations.

FIG. 14 depicts an example scenario in which a workpiece tool 1400 is utilized to align two workpieces 1402 and 1404. The workpiece tool 1400 may be, for example, the workpiece tool 200 of FIG. 3. The workpiece tool 1400 includes a first side panel 1406 and a second side panel 1408. The side panels 1406 and 1408 form an angle with respect to one another, but do not contact or intersect each other. The angle may vary, such as through use of an adjustable hinge indirectly connecting the side panel 1406 to the side panel 1408. Each of the side panels 1406 and 1408 has an interior surface and an exterior surface. The workpiece 1402 is aligned with the interior surface of the first side panel 1406, and the workpiece 1404 is aligned with the interior surface of the second side panel 1408. Accordingly, the workpieces 1402 and 1404 are aligned at a specific angle to one another. When a workpiece is aligned with the interior surface of a side panel, the workpiece may additionally be aligned with the diaphragm.

The workpiece tool 1400 further includes a master cutout 1410. The master cutout 1410 provides access to an interior joint formed by the workpieces 1402 and 1404. This access may be utilized, for example, to insert welding equipment and perform welding techniques on the interior joint formed by workpieces 1402 and 1404. Accordingly, a single configuration is capable of providing simultaneous access to all points in proximity to the intersection of workpieces 1402 and 1404.

Optionally, the workpieces 1402 and 1404 may be clamped or otherwise fastened to the side panels 1406 and 1408, respectively. For example, workpiece 1402 may be clamped to the side panel 1406 by affixing a clamping device to an interior surface of the workpiece 1402 and to the exterior surface of the side panel 1406. Likewise, workpiece 1404 may be clamped to the side panel 1408 by affixing a clamping device to an interior surface of the workpiece 1404 and to the exterior surface of the side panel 1408. In some implementations, a portion of a clamp is passed through a cutout in the workpiece tool 1400.

Figure 15:
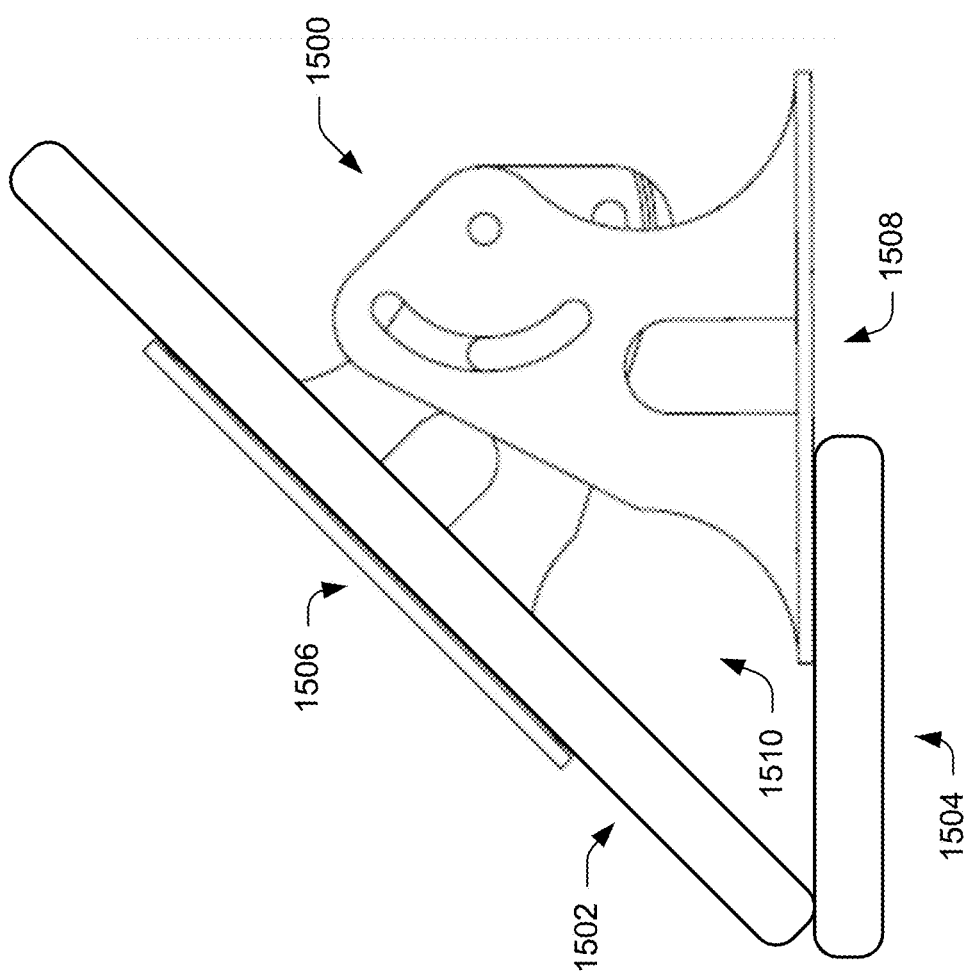
FIG. 15 is an illustration of an example scenario in which two workpieces are aligned at a specific angle through use of an example workpiece tool in accordance with one or more implementations.

FIG. 15 depicts an example scenario in which a workpiece tool 1500 is utilized to align two workpieces 1502 and 1504. The workpiece tool 1500 may be, for example, the workpiece tool 200 of FIG. 3. The workpiece tool 1500 includes a first side panel 1506 and a second side panel 1508. The side panels 1506 and 1508 form an angle with respect to one another, but do not contact or intersect each other. The angle may vary, such as through use of an adjustable hinge indirectly connecting the side panel 1506 to the side panel 1508. Each of the side panels 1506 and 1508 has an interior surface and an exterior surface. The workpiece 1502 is aligned with the interior surface of the first side panel 1506, and the workpiece 1504 is aligned with the exterior surface of the second side panel 1508. Accordingly, the workpieces 1502 and 1504 are aligned at a specific angle to one another. When a workpiece is aligned with the interior surface of a side panel, the workpiece may additionally be aligned with the diaphragm.

The workpiece tool 1500 further includes a master cutout 1510. The master cutout 1510 provides access to an interior joint formed by the workpieces 1502 and 1504. This access may be utilized, for example, to insert welding equipment and perform welding techniques on the interior joint formed by workpieces 1502 and 1504. Accordingly, a single configuration is capable of providing simultaneous access to all points in proximity to the intersection of workpieces 1502 and 1504.

Optionally, the workpieces 1502 and 1504 may be clamped or otherwise fastened to the side panels 1506 and 1508, respectively. For example, workpiece 1502 may be clamped to the side panel 1506 by affixing a clamping device to an interior surface of the workpiece 1502 and to the exterior surface of the side panel 1506. Likewise, workpiece 1504 may be clamped to the side panel 1508 by affixing a clamping device to an exterior surface of the workpiece 1504 and to the interior surface of the side panel 1508. In some implementations, a portion of a clamp is passed through a cutout in the workpiece tool 1500.

Figure 16:
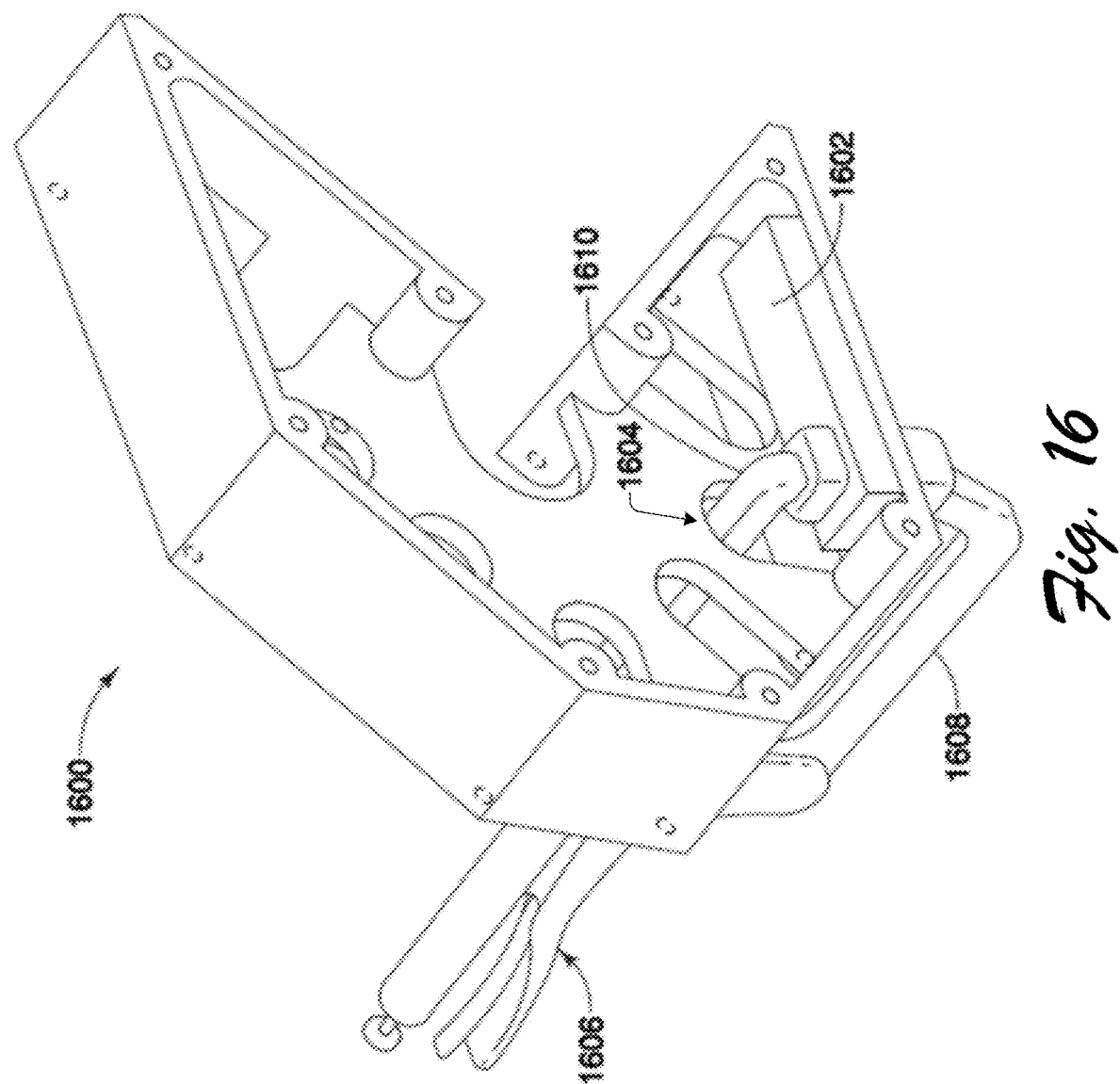
FIG. 16 is an illustration of an example scenario in which a workpiece is affixed to an example workpiece tool in accordance with one or more implementations.

FIG. 16 depicts an example scenario in which a workpiece tool 1600 is utilized to align a workpiece 1602. The workpiece tool 1600 includes a cutout 1604. The cutout 1604 is a pass-through opening for fasteners or clamps, and increases the accessibility and exposed area of surfaces of a respective side panel. In this way, a clamp or fastener may easily be attached to or access portions of the interior surfaces along the full width of the respective side panel, without interference from the diaphragm.

The workpiece 1602 is removably affixed to the workpiece tool 1600 through use of a clamp 1606. A first prong 1608 of the clamp 1606 is in contact with a surface of a side panel of the workpiece tool 1600, while a second prong 1610 of the clamp 1606 is in contact with the workpiece 1602 aligned with the opposite surface of the side panel. To do so, the second prong 1610 is disposed within the cutout 1604.

Figure 17:
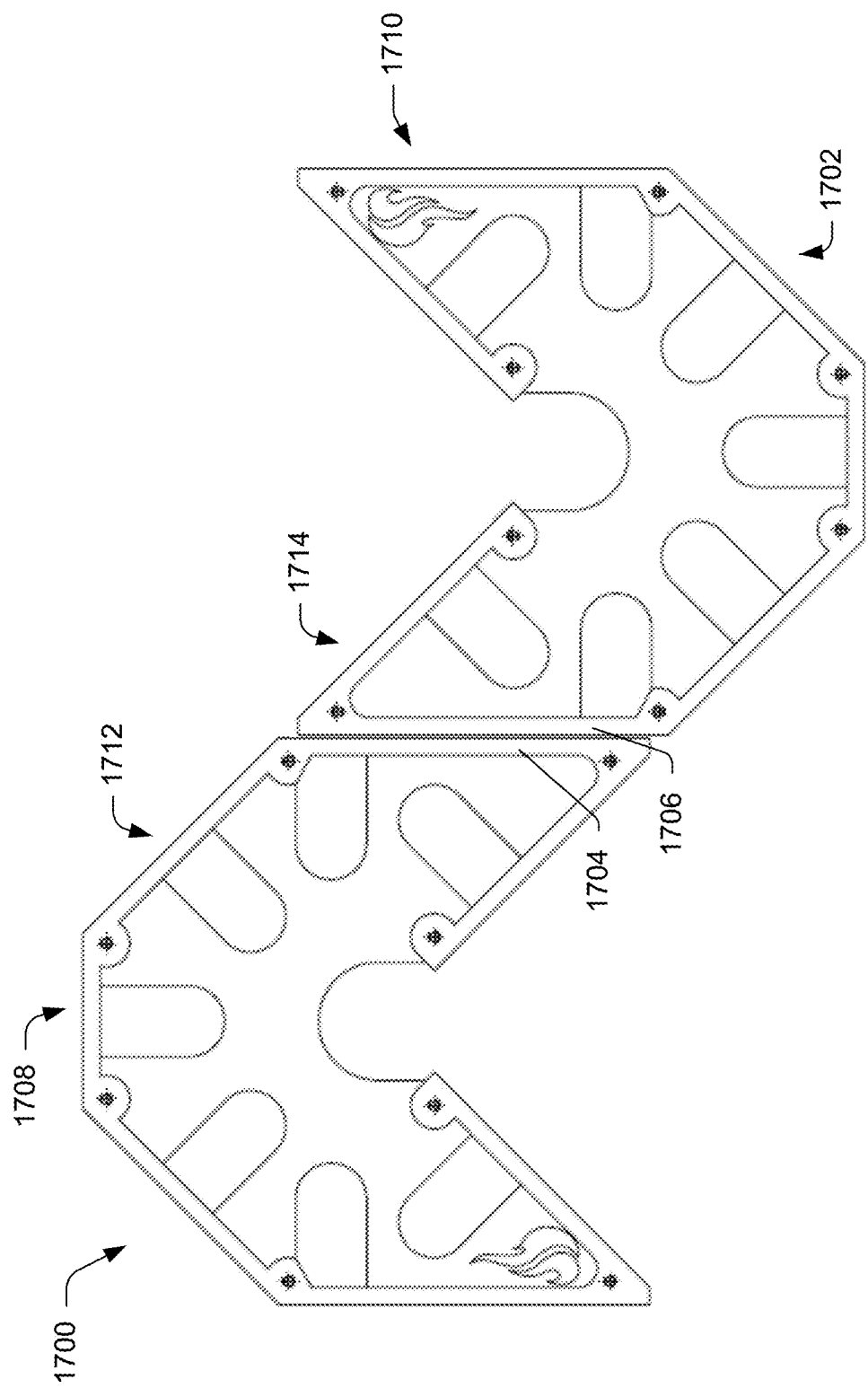
FIG. 17 is an illustration of an example scenario in which two example workpiece tools are aligned to one another in accordance with one or more implementations.

FIG. 17 depicts an example scenario in which two example modular workpiece tools 1700 and 1702 are combined to form additional geometrically aligned surfaces. The workpiece tool 1700 includes a side panel 1704, and the workpiece tool 1702 includes a side panel 1706. The side panels 1704 and 1706 are aligned, and may optionally be clamped or otherwise fastened to one another such as described above. In this way, geometric relationships among various side panels of the workpiece tool 1700 may be expanded to include geometric relationships with various side panels of the workpiece tool 1702. As an example, side panel 1704 and side panel 1708 of the workpiece tool 1700 are oriented at an angle of 90-degrees, and side panel 1706 and side panel 1710 of the workpiece tool 1702 are parallel. In such as example, a modular connection between workpiece tools 1700 and 1702 as depicted in FIG. 17 expands the available geometric relationships among side panels such as by orienting the side panel 1708 an angle of 90-degrees with respect to side panel 1710. In this way, a workpiece aligned with a side panel of the workpiece tool 1700 may be precisely aligned with respect to a workpiece aligned with a side panel of the workpiece tool 1702. Further, the modular workpiece tools 1700 and 1702 may be positioned to expand a surface. For example, as depicted in FIG. 17, a side panel 1712 of workpiece tool 1700 is combined with a side panel 1714 of workpiece tool 1702 to form a substantially continuous surface on a single plane.

Figure 18:
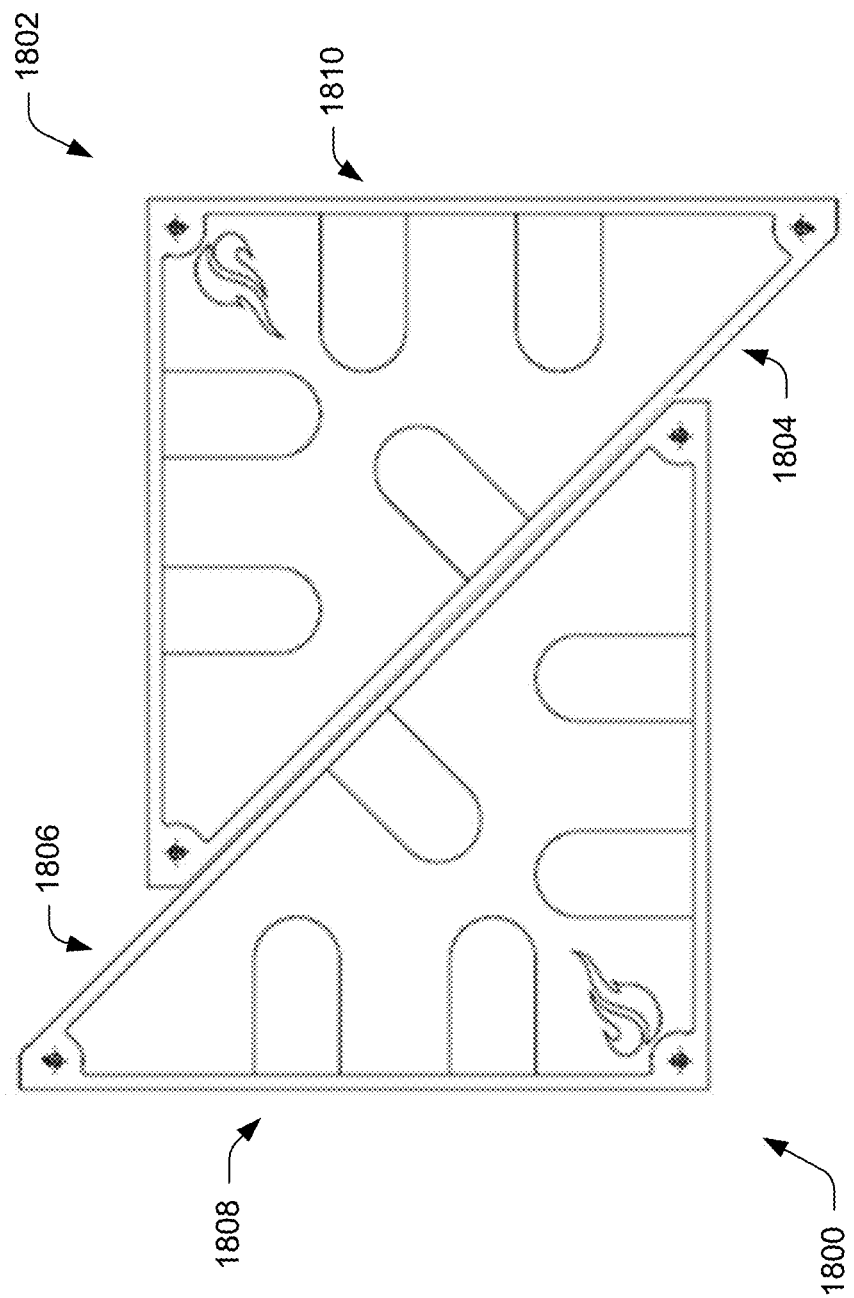
FIG. 18 is an illustration of an example scenario in which two example workpiece tools are aligned to one another in accordance with one or more implementations.

FIG. 18 depicts an example scenario in which two example modular workpiece tools 1800 and 1802 are combined to form additional geometrically aligned surfaces. The workpiece tool 1800 includes a side panel 1804, and the workpiece tool 1802 includes a side panel 1806. The side panels 1804 and 1806 are aligned, and may optionally be clamped or otherwise fastened to one another such as described above. In this way, geometric relationships among various side panels of the workpiece tool 1800 may be expanded to include geometric relationships with various side panels of the workpiece tool 1802.

As an example, it may be desirable to align two substantially straight workpieces to be parallel with a specified displacement. The workpiece tools 1800 and 1802 may be moved with respect to one another along the plane formed by side panels 1804 and 1806, thereby increasing or decreasing the displacement between a side panel 1808 of workpiece tool 1800 and a side panel 1810 of workpiece tool 1802. While conventional tools require a user to perform multiple manual measurements in multiple locations in order to orient objects to be parallel to one another, the modular workpiece tools 1800 and 1802 provide parallel planes of a fixed displacement. In this manner, the modular workpiece tools 1800 and 1802 allow workpieces to be quickly and easily oriented by aligning the workpieces with planes, rather than points.

Figure 19:
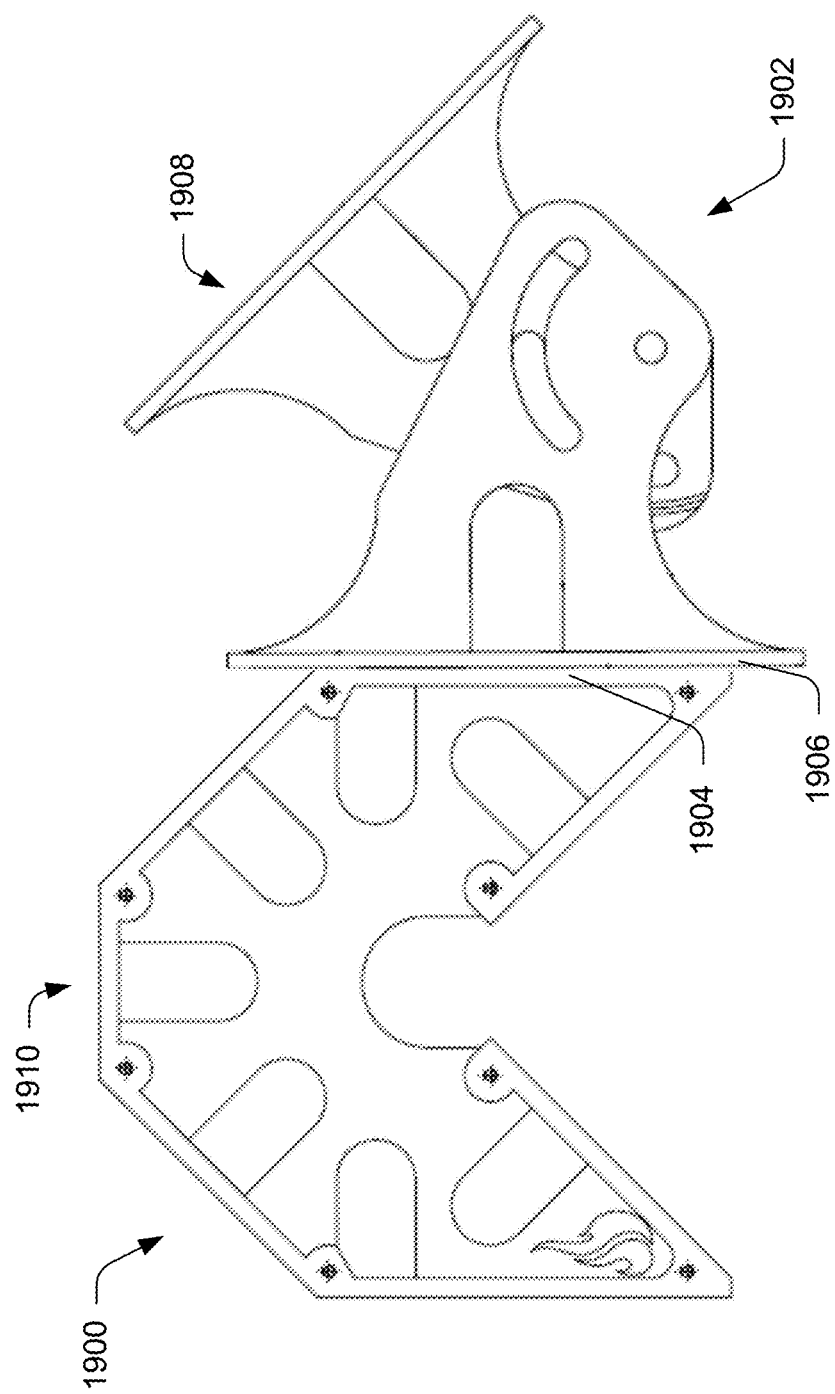
FIG. 19 is an illustration of an example scenario in which two example workpiece tools are aligned to one another in accordance with one or more implementations.

FIG. 19 depicts an example scenario in which two example modular workpiece tools 1900 and 1902 are combined to form additional geometrically aligned surfaces. The workpiece tool 1900 includes a side panel 1904, and the workpiece tool 1902 includes a side panel 1906. The side panels 1904 and 1906 are aligned, and may optionally be clamped or otherwise fastened to one another such as described above. In this way, geometric relationships among various side panels of the workpiece tool 1900 may be expanded to include geometric relationships with a side panel 1908 of the workpiece tool 1902. Thus, a workpiece aligned with a side panel of the workpiece tool 1900 may be precisely aligned with respect to a workpiece aligned with the side panel 1908 of the workpiece tool 1902.

This may be particularly useful, for instance, when an angle is required that is not formed by the workpiece tool 1900 itself. For example, the side panel 1908 of the workpiece tool 1902 may be rotated to form a variable angle with respect to the side panel 1910 of the workpiece tool 1900. This is particularly useful when aligning workpieces at an angle near 180-degrees. Although the workpiece tool 1900 by itself is capable of aligning the side panels 1906 and 1908 at or near 180-degrees (i.e., parallel), the point of intersection of the planes corresponding to the side panels 1906 and 1908 grows increasingly further away as the angle approaches 180-degrees. By establishing an angular relationship between the side panel 1908 and the side panel 1910, angles at or near 180-degrees may be created with a point of intersection located a reasonable distance (e.g., centimeters or inches) from the workpiece tools 1900 and 1902.

Figure 20B:
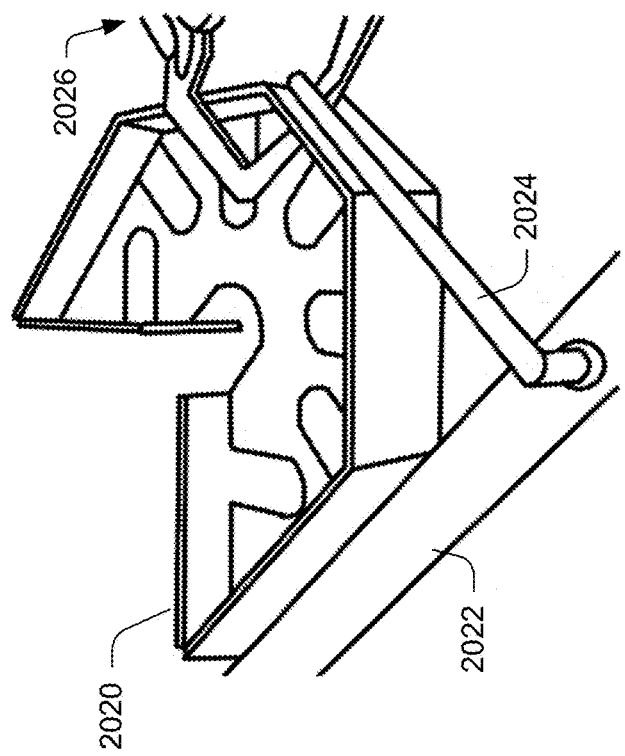
FIGS. 20A, 20B, 21A, 21B, 22A, 22B illustrate example scenarios in which example workpiece tools are utilized to align and/or hold various workpieces in accordance with one or more implementations.
Figure 20A:
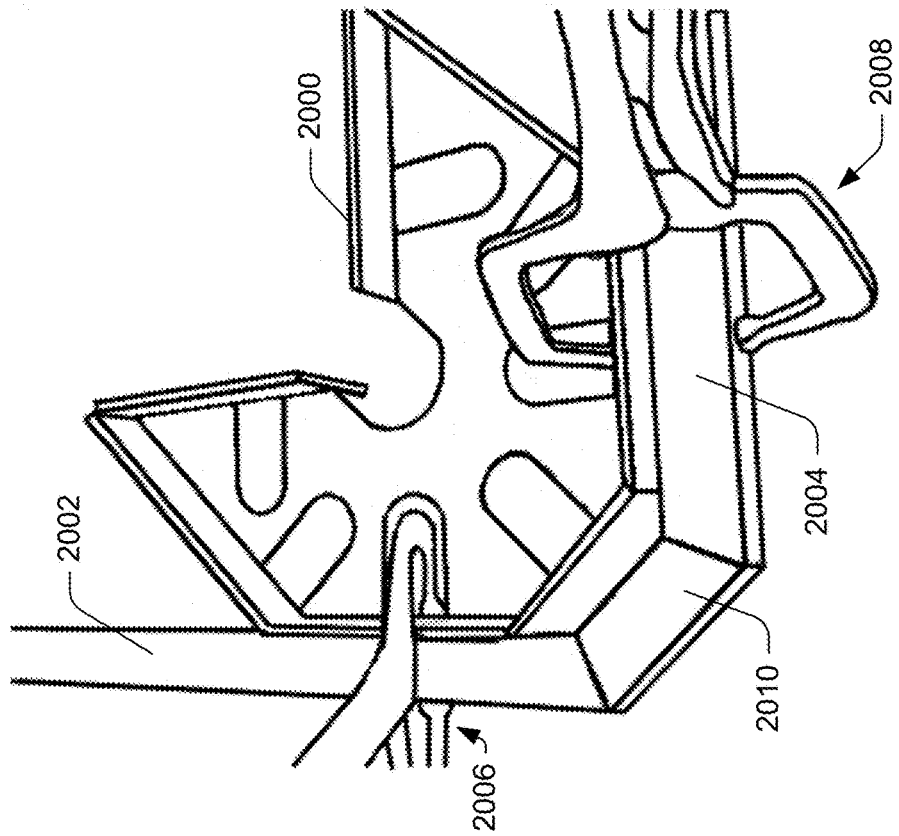

FIG. 20A depicts an example scenario in which a workpiece tool 2000 is utilized to align and hold various workpieces. In this example, two workpieces 2002 and 2004 are aligned with sides of the workpiece tool forming a 90-degree angle, and are held to the workpiece tool by utilizing clamps 2006 and 2008, respectively. However, a third workpiece 2010 is used to form a chamfered corner. Although the workpieces 2002 and 2004 are oriented at 90-degrees with respect to one another, no single joint forms a 90-degree angle. While conventional tools are blocked or obstructed by the workpiece 2010, the workpiece tool 2000 is able to accurately align and hold the various workpieces.

FIG. 20B depicts an example scenario in which a workpiece tool 2020 is utilized to align and hold various workpieces. In this example, two workpieces 2022 and 2024 are aligned with sides of the workpiece tool forming a 90-degree angle, and the workpiece 2024 is held to the workpiece tool by utilizing a clamp 2026. However, the first workpiece 2022 and the second workpiece 2024 are located on different vertical planes. Although workpieces 2022 and 2024 are oriented at 90-degrees with respect to one another, the workpieces do not intersect on the plane in which the 90-degree angle is formed. While conventional tools are unable to align objects that are located on different parallel planes, the workpiece tool 2020 is able to accurately align and hold the various workpieces.

Figure 21B:
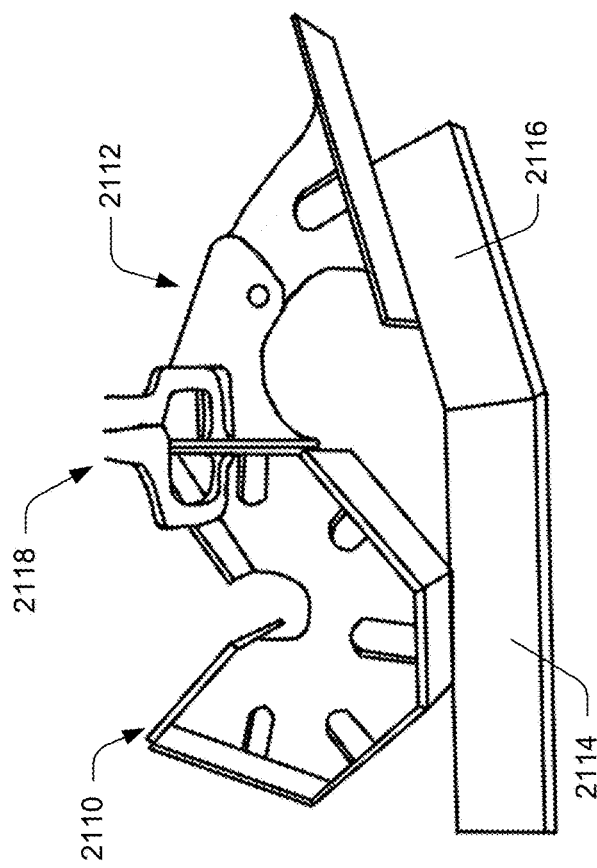
Figure 21A:
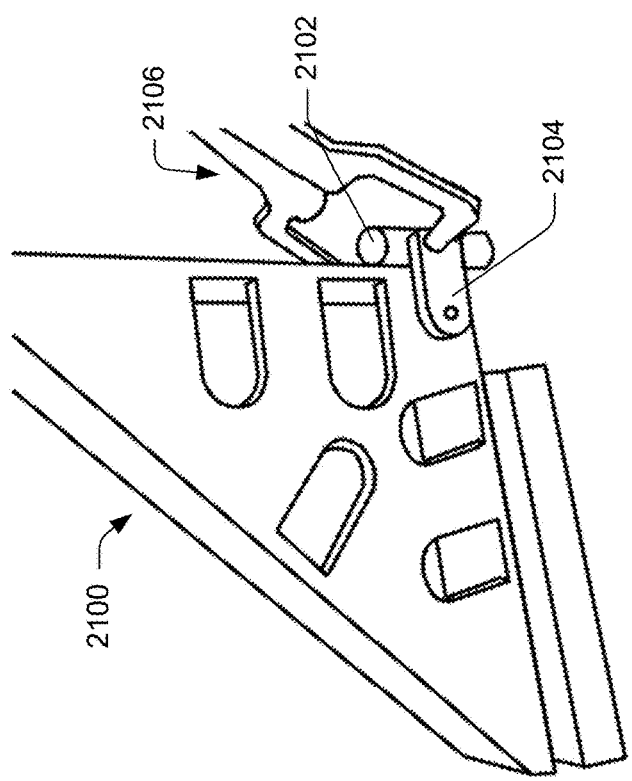

FIG. 21A depicts an example scenario in which a workpiece tool 2100 is utilized to align and hold various workpieces. In this example, a workpiece 2102 is aligned with a removable tab attachment 2104 that is connected to the workpiece tool 2100. The workpiece 2102 is held to the removable tab attachment 2104 by using a clamp 2106. In this manner, the workpiece 2102 is aligned at a point of tangency with respect to both a side of the workpiece tool 2100 and the removable tab attachment 2104.

FIG. 21B depicts an example scenario in which multiple workpiece tools 2110 and 2112 are utilized to align and hold workpieces 2114 and 2116. In this example, the workpiece tools 2110 and 2112 are aligned with one another by aligning respective side panels. The workpiece tools 2110 and 2112 are held together by using a clamp 2118. The workpieces 2114 and 2116 are aligned at an angle with respect to one another by aligning the workpiece 2114 with a side panel of the workpiece tool 2110, and aligning the workpiece 2116 with a side panel of the workpiece tool 2112.

Figure 22B:
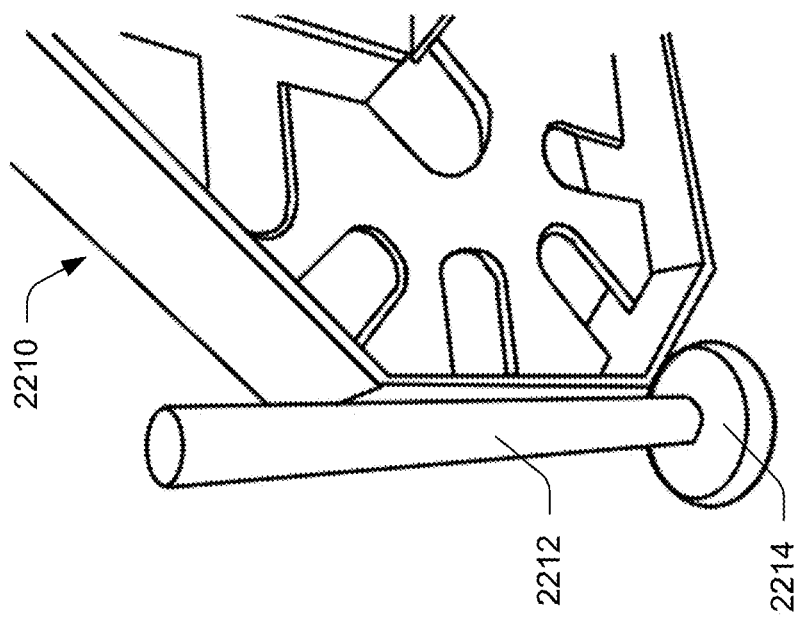
Figure 22A:
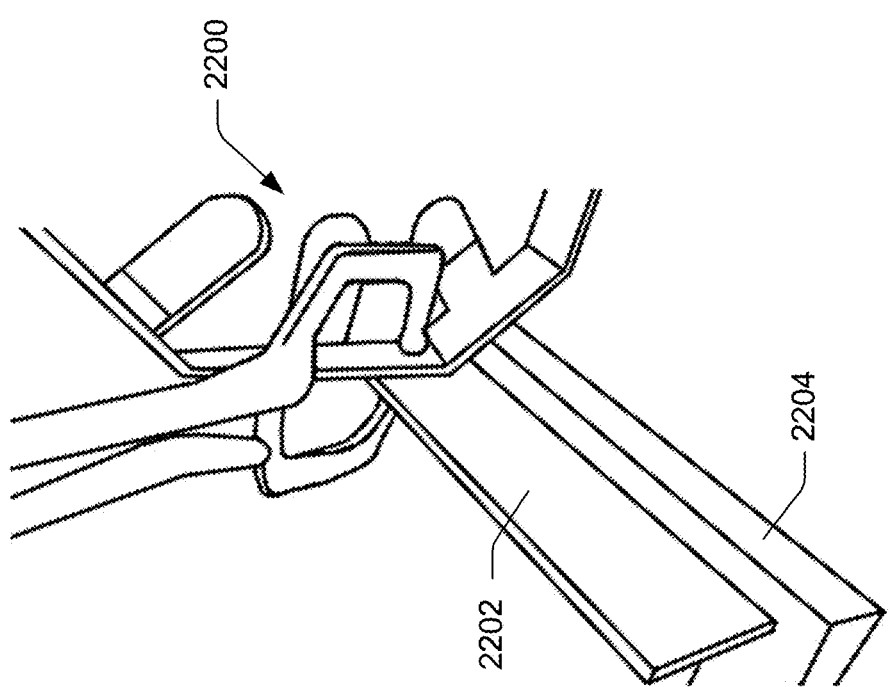

FIG. 22A depicts an example scenario in which a workpiece tool 2200 is utilized to align and hold various workpieces. In this example, two workpieces 2202 and 2204 are aligned to form a 'T' shape. However, the workpiece 2204 does not provide sufficient contact areas proximate the workpiece 2202 with which to provide an alignment via a conventional tool. The workpiece 2202 is instead aligned and held to a side of the workpiece tool 2200. While conventional tools are unable to provide alignment due to the portions of workpiece 2204 that necessarily protrude to form the 'T' shape, the accessibility cutout of the workpiece tool 2200 allows accurate alignment of the workpieces 2202 and 2204.

FIG. 22B depicts an example scenario in which a workpiece tool 2210 is utilized to align and hold various workpieces. In this example, a workpiece 2212 is aligned to be vertical. However, the workpiece 2212 is fixed to a collar 2214 that obstructs access to a bottom portion of the workpiece 2212. The workpiece 2212 is instead aligned at a vertically higher point and held to a side of the workpiece tool 2210. While conventional tools are unable to provide alignment due to the obstructing collar 2214, an access space of the workpiece tool 2210 allows accurate alignment of the workpiece 2212.

Figure 23:
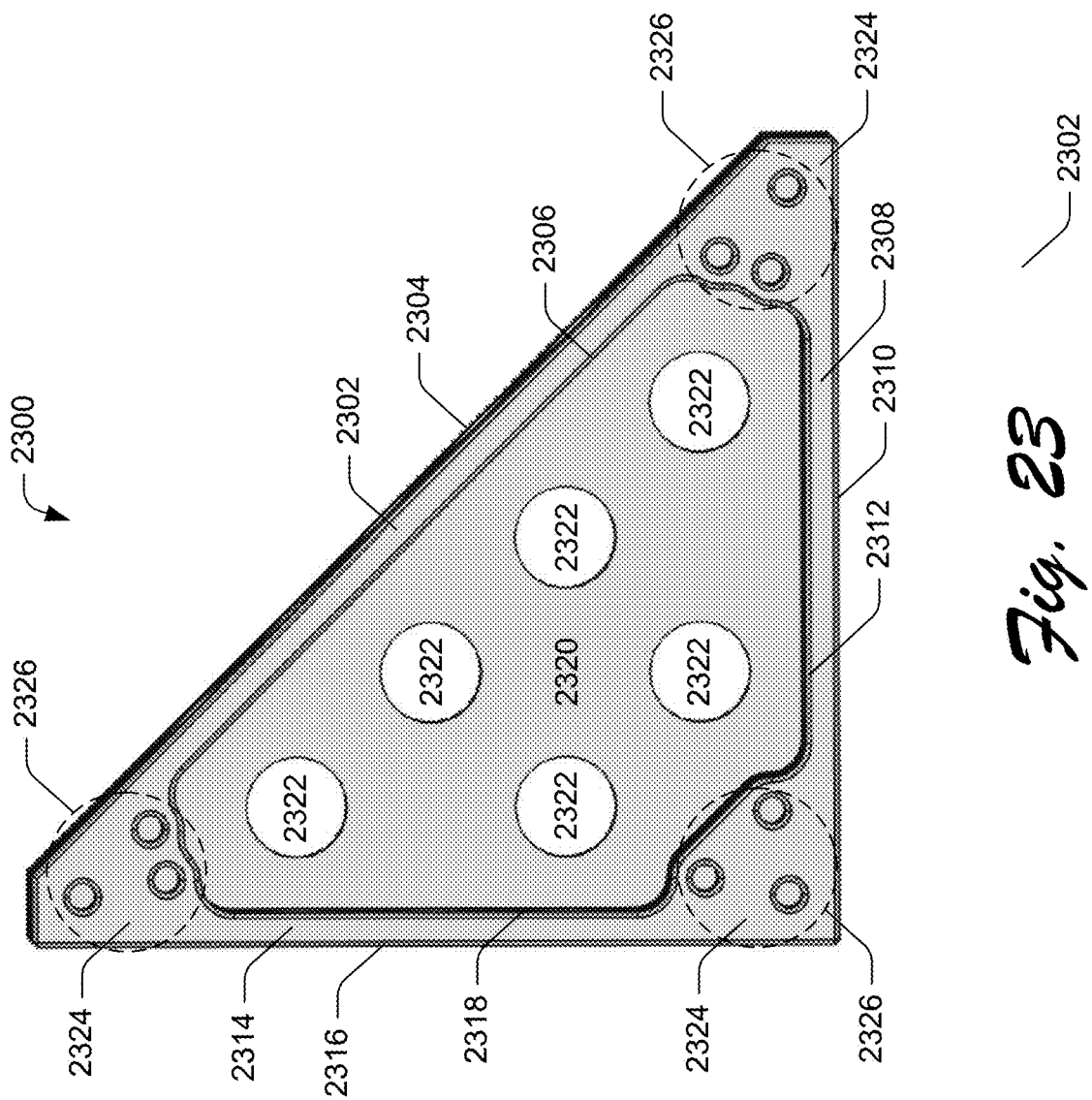
FIG. 23 depicts a workpiece tool according to one or more implementations.

FIG. 23 depicts a workpiece tool 2300 according to one or more implementations. In at least some implementations the workpiece tool 2300 represents a variation on the workpiece tool 100 and incorporates at least some features and/or attributes of the workpiece tool 100.

The workpiece tool 2300 includes a side panel 2302 with an exterior surface 2304 and an interior surface 2306, a side panel 2308 with an exterior surface 2310 and an interior surface 2312, and a side panel 2314 with an exterior surface 2316 and an interior surface 2318. According to implementations, workpieces can be placed against the exterior surfaces 2304, 2310, 2316 at various orientations to enable work to be applied to the workpieces.

The workpiece tool 2300 further includes a diaphragm 2320 that is at least partially connected to the side panels 2302, 2308, 2314. The diaphragm 2320, for instance, spans an interior space between the side panels 2302, 2308, 2314 and is approximately perpendicular to the side panels 2302, 2308, 2314. Further, the diaphragm 2320 is recessed relative to upper edges of the side panels 2302, 2308, 2314. The diaphragm 2320 includes apertures 2322 that are perforate the diaphragm 2320. According to implementations the apertures 2322 are sized and spaced relative to one another to enable alignment of the apertures 2322 with apertures in an adjacent surface, such as a welding table and/or other apertured work surface. For instance, a pin, bolt, screw, and/or other attachment mechanism can be placed through the apertures 2322 to secure the workpiece tool 2300 to an adjacent surface.

In at least one implementation the apertures 2322 have a diameter in a range of 10-20 millimeters. Further, the apertures 2322 are spaced in a range of 1-3 inches on center relative to one another. This is not to be construed as limiting, however, and the apertures 2322 can be implemented in a variety of different sizes and spacings.

The workpiece tool 2300 further includes corner sections 2324 that partially span regions between the interior surfaces 2306, 2312, 2318 of the side panels 2302, 2308, 2314, respectively. Further, the corner sections 2324 include perforations 2326 that are formed to accept insertion of a pin, bolt, screw, and/or other mechanism. In at least one implementation the perforations 2326 are tapped to accept threaded insertion of a threaded object.

Figure 24:
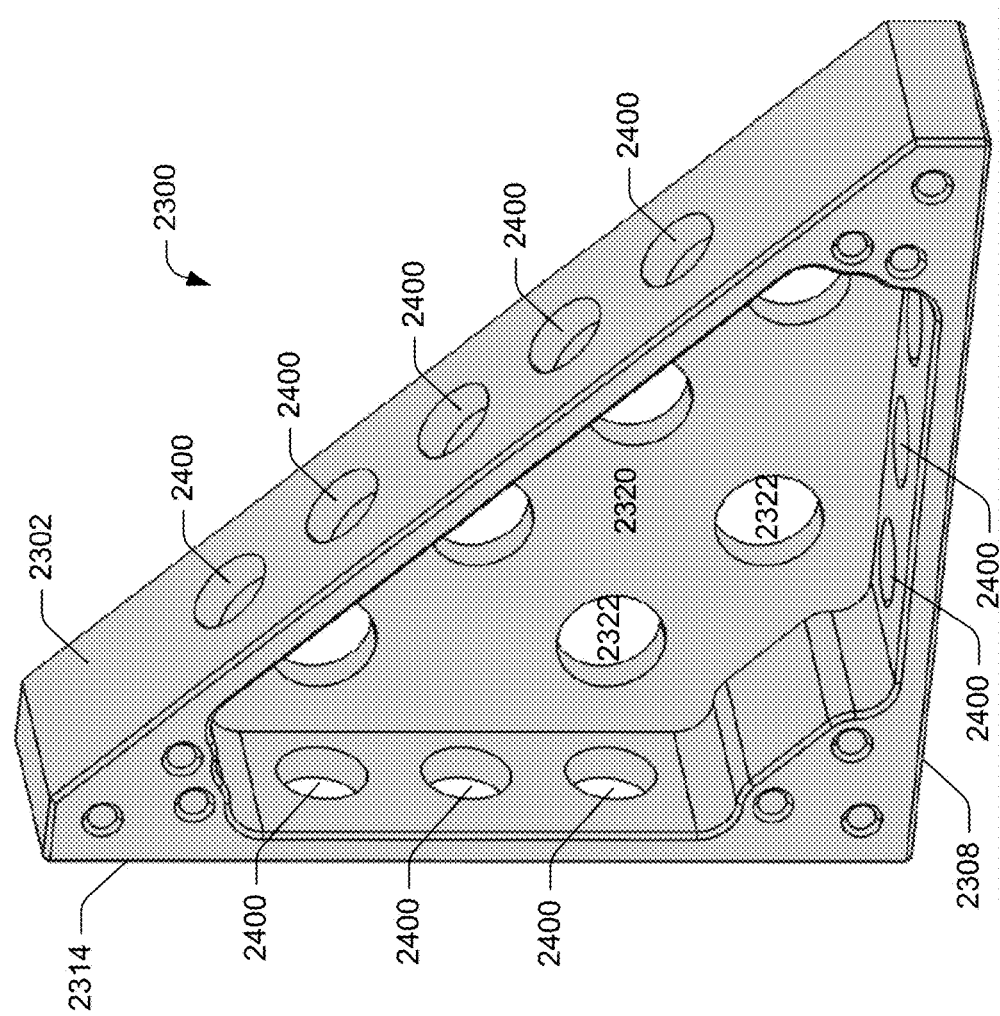
FIG. 24 depicts the workpiece tool in accordance with one or more implementations.

FIG. 24 depicts the workpiece tool 2300 in accordance with one or more implementations. In this particular view the workpiece tool 2300 includes the apertures 2322 in the diaphragm 2320 as well as apertures 2400 in the side panels 2302, 2308, 2314. According to implementations the apertures 2400 are sized and spaced relative to one another to enable alignment of the apertures 2400 with apertures in an adjacent surface, such as a welding table and/or other apertured work surface. For instance, a pin, bolt, screw, and/or other attachment mechanism can be placed through the apertures 2400 to secure the workpiece tool 2300 to an adjacent surface.

In at least one implementation the apertures 2400 have a diameter in a range of 10-20 millimeters. Further, the apertures 2400 are spaced in a range of 1-3 inches on center relative to one another. This is not to be construed as limiting, however, and the apertures 2400 can be implemented in a variety of different sizes and spacings.

Figure 25:
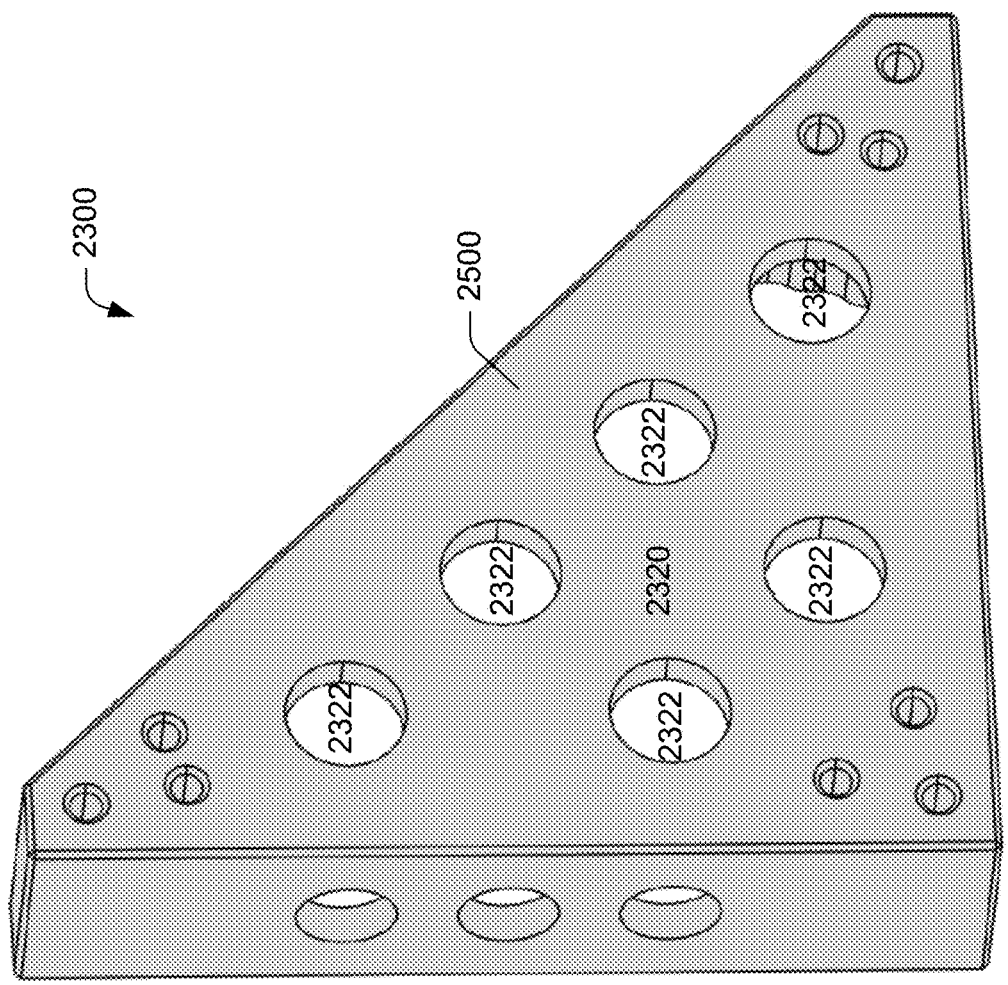
FIG. 25 depicts a bottom view of the workpiece tool in accordance with one or more implementations.

FIG. 25 depicts a bottom view of the workpiece tool 2300 in accordance with one or more implementations. In this view a bottom surface 2500 of the diaphragm 2320 is visible along with the apertures 2322 through the diaphragm 2320.

Figure 26:
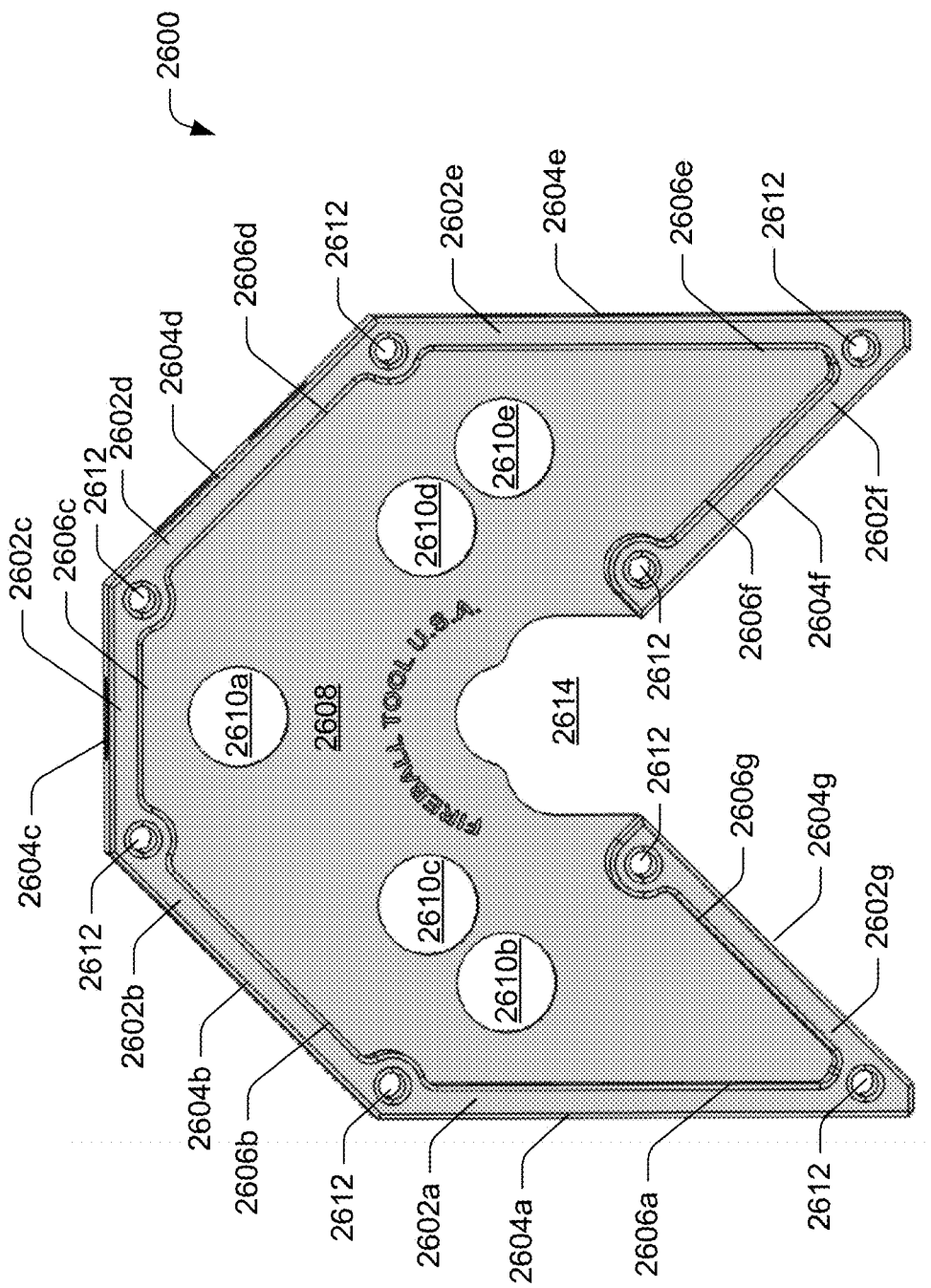
FIG. 26 depicts a workpiece tool in accordance with one or more implementations.

FIG. 26 depicts a workpiece tool 2600 in accordance with one or more implementations. The workpiece tool 2600 includes a plurality of side panels 2602 including side panels 2602a, 2602b, 2602c, 2602d, 2602e, 2602f, 2602g. The side panels 2602 are interconnected at different angles to enable a variety of different workpiece scenarios. Further, the side panels 2602 include respective exterior surfaces 2604 including respective exterior surfaces 2604a, 2604b, 2604c, 2604d, 2604e, 2604f, 2604g. The side panels 2602 also include respective interior surfaces 2606 including respective interior surfaces 2606a, 2606b, 2606c, 2606d, 2606e, 2606f, 2606g.

The workpiece tool 2600 further includes a diaphragm 2608 that at least partially spans an area between the side panels 2602. The diaphragm 2608 includes apertures 2610 including apertures 2610a, 2610b, 2610c, 2610d, 2610e. In at least one implementation the apertures 2610 have a diameter in a range of 10-20 millimeters. Further, the apertures 2610b, 2610c are spaced in a range 1-3 inches on center, e.g., center to center. Similarly, the apertures 2610d, 2610e are spaced in a range 1-3 inches on center. In implementations, an attachment mechanism can be placed through the apertures 2610 to attach the workpiece tool 2600 to an adjacent surface.

The workpiece tool 2600 further includes perforations 2612 and a cutout 2614. In at least one implementation the perforations 2612 are tapped to accept threaded insertion of a threaded object. Further, the perforations 2612 are positioned at junctures between the side panels 2602. The cutout 2614 is positioned at a center of the workpiece tool 2600 and enables a workpiece to be placed in a centered position relative to the workpiece tool 2600. For instance, the exterior surface 2604f of the side panel 2602f defines a first plane that intersects a second plane defined the exterior surface 2604g of the side panel 2602g. Thus, a set of workpieces can be placed (e.g., clamped) along the exterior surfaces 2604g, 2604g such that the ends of the workpieces are positioned within the cutout 2614, such as to enable the workpieces to be joined at their ends.

Figure 27:
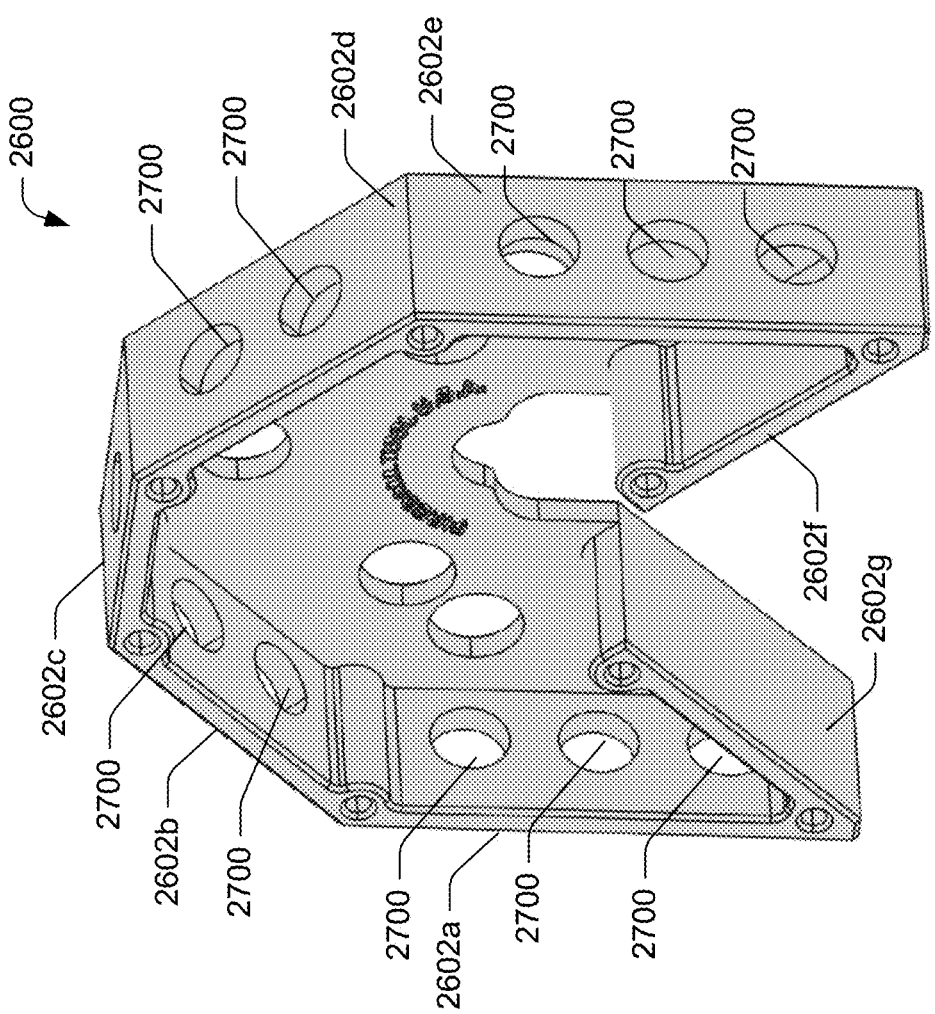
FIG. 27 depicts the workpiece tool in accordance with one or more implementations.

FIG. 27 depicts the workpiece tool 2600 in accordance with one or more implementations. In this particular view the workpiece tool 2600 includes apertures 2700 in the side panels 2602. According to implementations the apertures 2700 are sized and spaced relative to one another to enable alignment of the apertures 2700 with apertures in an adjacent surface, such as a welding table and/or other apertured work surface. For instance, a pin, bolt, screw, and/or other attachment mechanism can be placed through the apertures 2700 to secure the workpiece tool 2600 to an adjacent surface.

In at least one implementation the apertures 2700 have a diameter in a range of 10-20 millimeters. Further, the apertures 2700 are spaced in a range of 1-3 inches on center relative to one another. This is not to be construed as limiting, however, and the apertures 2700 can be implemented in a variety of different sizes and spacings.

Figure 28:
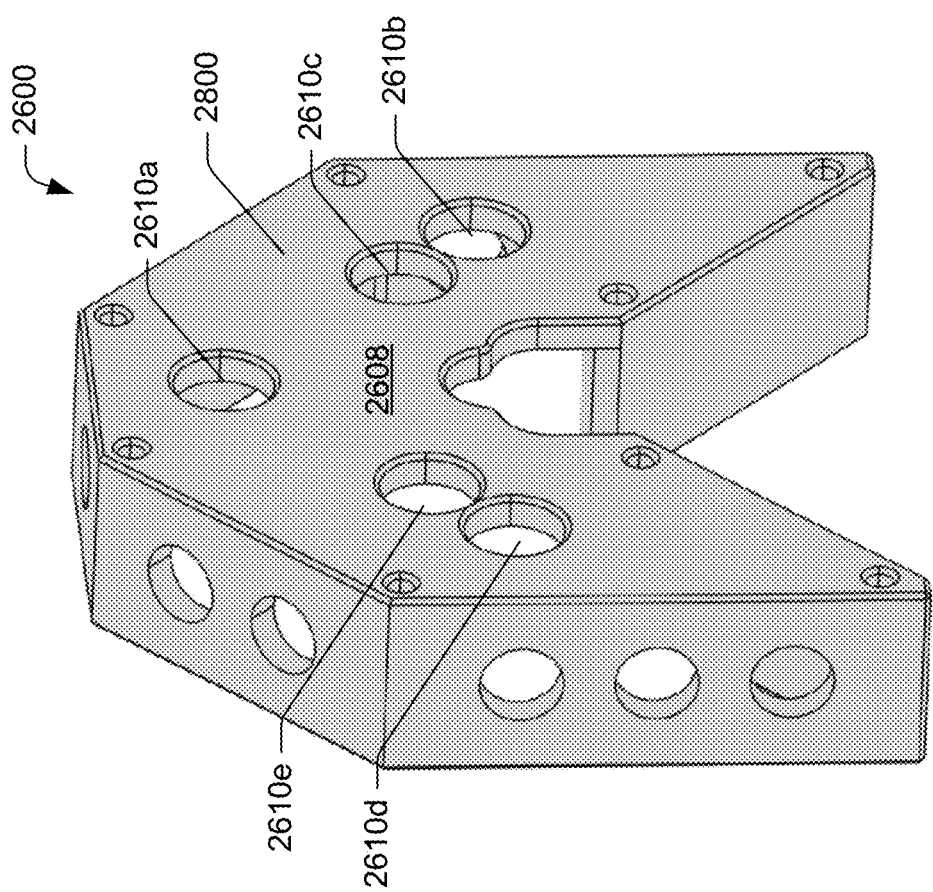
FIG. 28 depicts a bottom view of the workpiece tool in accordance with one or more implementations.

FIG. 28 depicts a bottom view of the workpiece tool 2600 in accordance with one or more implementations. In this view a bottom surface 2800 of the diaphragm 2608 is visible along with the apertures 2610 through the diaphragm 2608.

Figure 29:
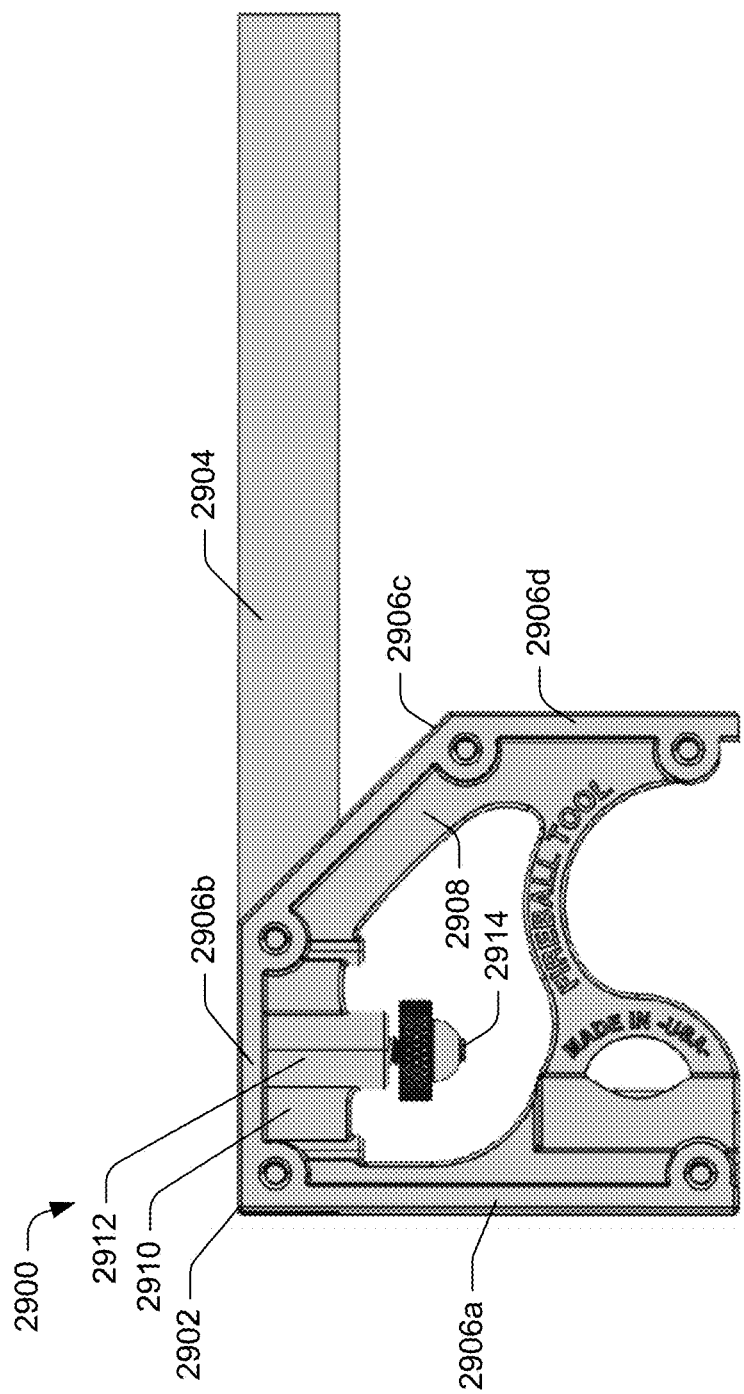
FIG. 29 depicts an adjustable tool according to one or more implementations.

FIG. 29 depicts an adjustable tool 2900 according to one or more implementations. The adjustable tool 2900 includes a tool body 2902 and a slidable member 2904 slidably engaged at least partially within the tool body 2902. In at least one implementation the slidable member 2904 includes rule marks that are spaced according to different spacing increments, such as inches, centimeters, etc., and fractions thereof. The slidable member 2904, for instance, represents a ruler that is usable for measuring objects and/or spacing between objects, e.g., workpieces.

The tool body 2902 includes side panels 2906 including side panels 2906a, 2906b, 2906c, 2906d. Further, the tool body 2902 includes a diaphragm 2908 that at least partially spans a region between the side panels 2906. The diaphragm 2908 includes an insertion region 2910 which represents a region of the diaphragm 2908 into which the slidable member 2904 can be inserted. The insertion region 2910 includes a securing mechanism 2912 which in turn includes an adjustment member 2914.

According to implementations the securing mechanism 2912 is operable to allow or restrict (e.g., prevent) movement of the slidable member 2904 relative to the tool body 2902. For instance, manipulation of the adjustment member 2914 to a first position can allow slidable movement of the slidable member 2904 relative to the tool body 2902, and manipulation of the adjustment member 2914 to a second position can restrict slidable movement of the slidable member 2904 relative to the tool body 2902. In an example implementation the securing mechanism 2912 includes an internal clamp that can apply and release pressure on the slidable member 2904 to control whether the slidable member 2904 can be moved relative to the tool body 2902. For instance, rotating the adjustment member 2914 clockwise can cause the securing mechanism 2912 to increase pressure applied to the slidable member 2904 to restrict movement of the slidable member 2904, and rotating the adjustment member 2914 counterclockwise can cause the securing mechanism 2912 to reduce (e.g., release) pressure on the slidable member 2904 to allow slidable movement of the slidable member 2904 relative to the tool body 2902.

Figure 30:
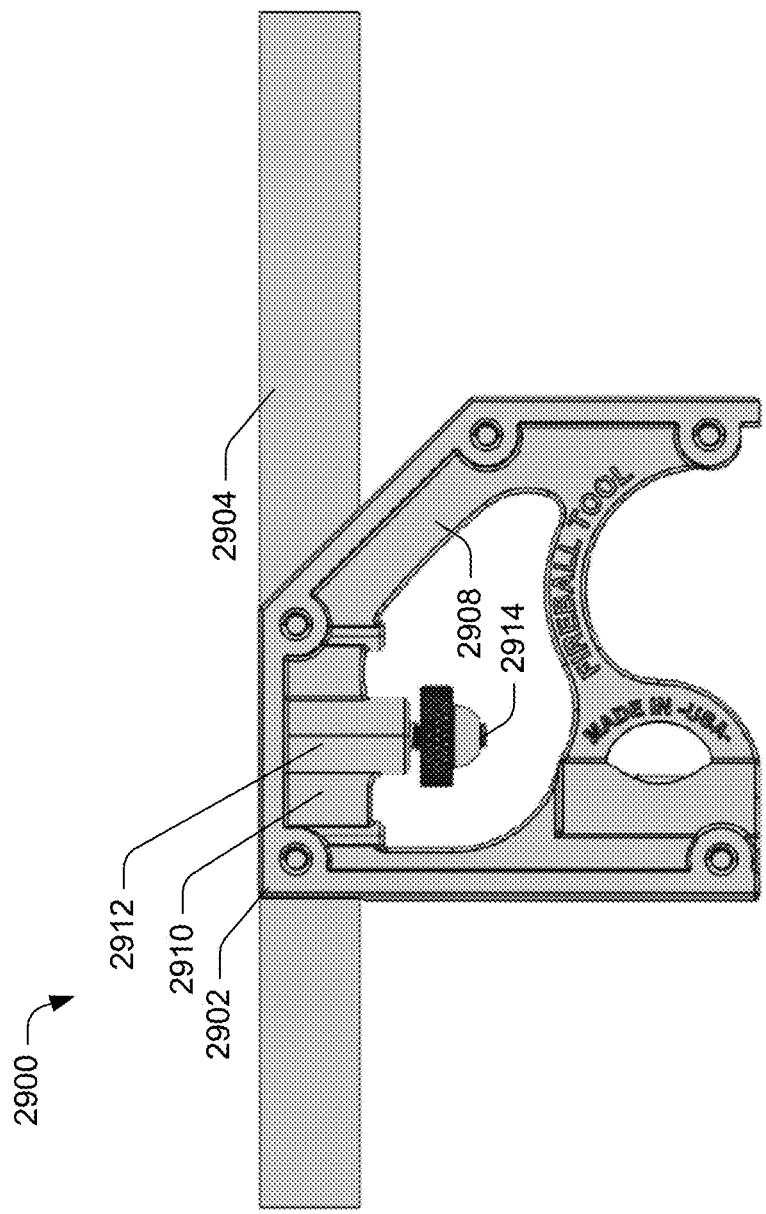
FIG. 30 depicts an implementation of the adjustable tool with the slidable member repositioned relative to the tool body in accordance with one or more implementations.

FIG. 30 depicts an implementation of the adjustable tool 2900 with the slidable member 2904 repositioned relative to the tool body 2902 in accordance with one or more implementations. For instance, the adjustment member 2914 is manipulated to cause the securing mechanism 2912 to allow the slidable member 2904 to slide laterally within the insertion region 2910 and to be repositioned relative to the tool body 2902, e.g., relative to the position depicted in FIG. 29.

Figure 31:
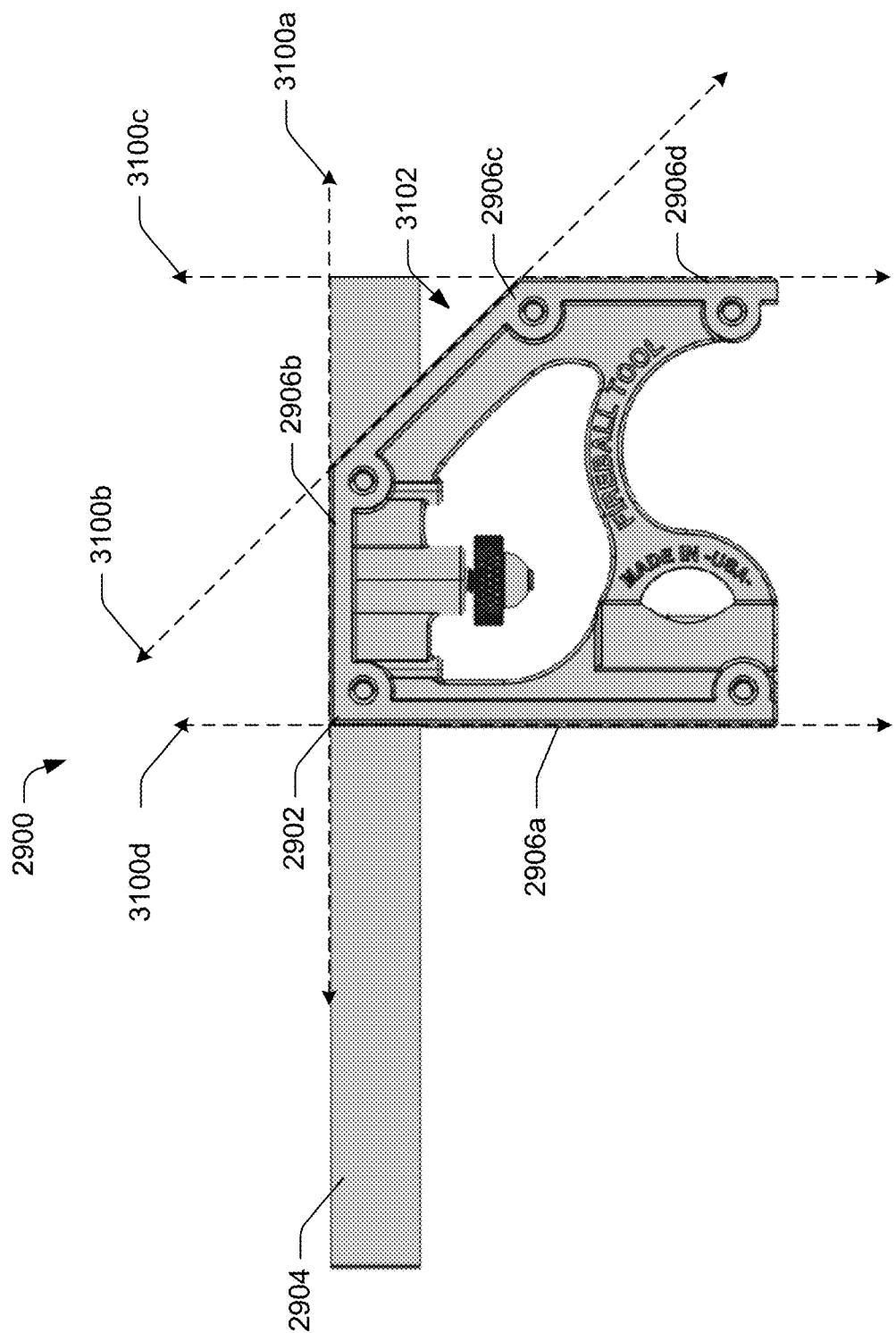
FIG. 31 depicts example geometric attributes of the adjustable tool in accordance with one or more implementations.

FIG. 31 depicts example geometric attributes of the adjustable tool 2900 in accordance with one or more implementations. In FIG. 31, the slidable member 2904 has been repositioned relative to the tool body 2902. Further, FIG. 31 illustrates that the side panel 2906b defines a plane 3100a, the side panel 2906c defines a plane 3100b, and the side panel 2906d defines a plane 3100c. In at least one implementation, the side panel 2906c is at a 45 degree angle relative to the side panels 2906b, 2906c, e.g., the plane 3100b intersects the planes 3100a, 3100c at 45 degrees.

Accordingly, intersection of the different planes 3100 illustrates that the adjustable tool 2900 forms an open region 3102 encompassed by the planes 3100a, 3100b, 3100c. Further, the slidable member 2904 is extendable into and retractable from the open region 3102. For instance, consider that in a usage scenario the side panel 2906d is clamped against a surface such as a welding table. This would enable the open region 3102 to be used for various purposes, such as measuring workpieces using the slidable member 2904.

The side panel 2906a defines a plane 3100d that intersects the plane 3100a, e.g., at 90 degrees. In at least one implementation the side panels 2906a, 2906d are substantially parallel.

Figure 32:
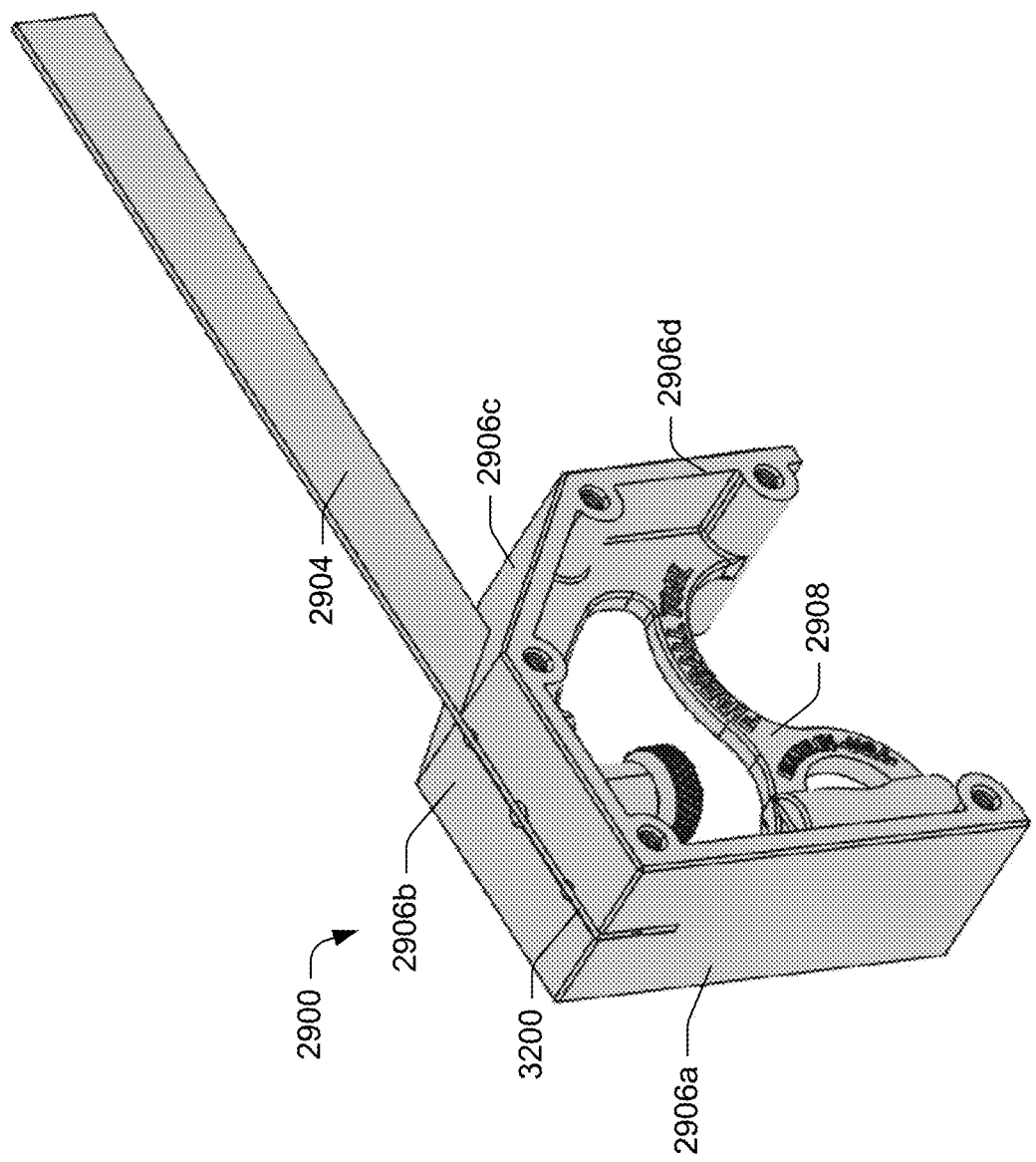
FIG. 32 depicts the adjustable tool at an angled orientation in accordance with one or more implementations.

FIG. 32 depicts the adjustable tool 2900 at an angled orientation in accordance with one or more implementations. This this illustrates that the diaphragm 2908 is inset relative to the side panels 2906 which exposes interior surfaces of the side panels 2906. This allows the side panels 2906 to be manipulated in different ways, such as clamped against an adjacent surface to support different work scenarios.

FIG. 32 also illustrates that the side panel 2906b includes a slot 3200 in which the slidable member 2904 is positioned. The slot 3200, for instance, perforates an outer surface of the side panel 2906b and extends into the insertion region 2910 and the securing mechanism 2912, which are illustrated in previous figures and introduced above. Accordingly, the slidable member 2904 is movable laterally within the slot 3200.

Figure 33:
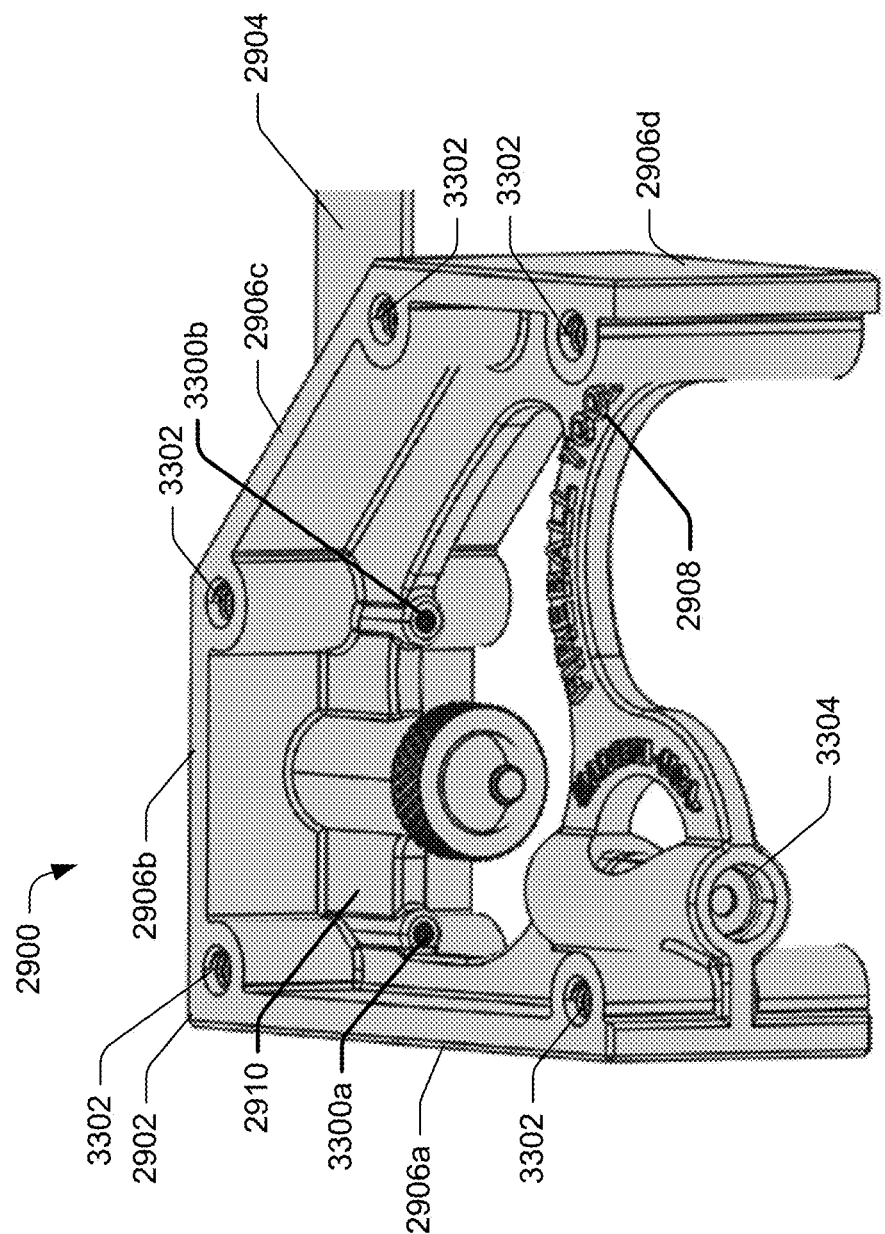
FIG. 33 depicts a bottom view of the adjustable tool in accordance with one or more implementations.

FIG. 33 depicts a bottom view of the adjustable tool in accordance with one or more implementations. In this implementation the insertion region 2910 of the diaphragm 2908 includes an adjustment member 3300a and an adjustment member 3300b that are operable to adjust an orientation of the slidable member 2904 relative to the tool body 2902. As further discussed below, for example, the adjustment members 3300 can be manipulated to adjust a position (e.g., height) of the slidable member 2904 within the slot 3200 of the insertion region 2910. The adjustment members 3300 can be implemented in various ways, such as inset screws (e.g., Allen screws) placed within the insertion region 2910.

Also illustrated is that the tool body 2902 includes perforations 3302 at different points along the side panels 2906. The perforations 3302, for instance, are positioned at a juncture of each side panel 2906. In implementations the perforations 3302 are formed to accept insertion of a pin, bolt, screw, and/or other mechanism. In at least one implementation the perforations 3302 are tapped to accept threaded insertion of a threaded object.

Also illustrated is that the adjustable tool 2900 includes a level 3304 that is positioned to enable the side panel 2906a to be utilized to determine a level status of an adjacent object. For instance, the side panel 2906a can be placed on a surface and the level 3304 can be utilized to determine a level status of the surface.

Figure 34:
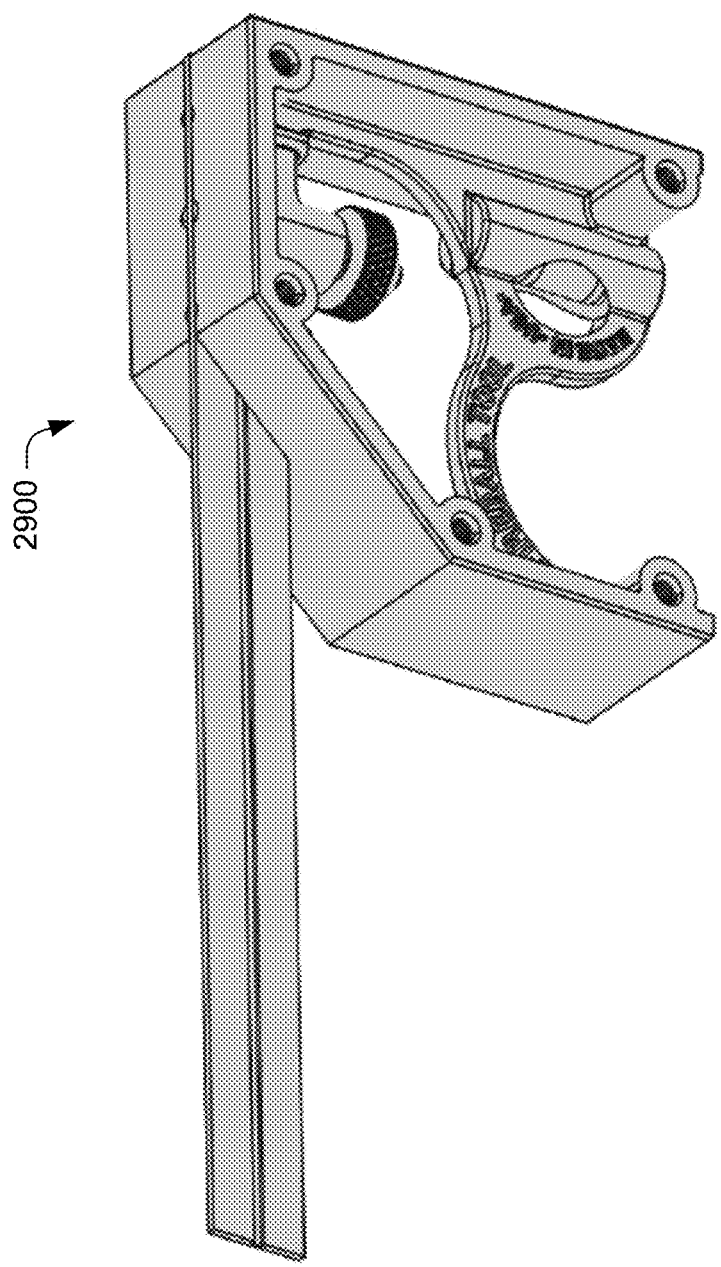
FIG. 34 depicts an upper side view of the adjustable tool in accordance with one or more implementations.

FIG. 34 depicts an upper side view of the adjustable tool 2900 in accordance with one or more implementations. This view, for example, shows an opposite side of the adjustable tool 2900 than illustrated in the previous figures.

Figure 35:
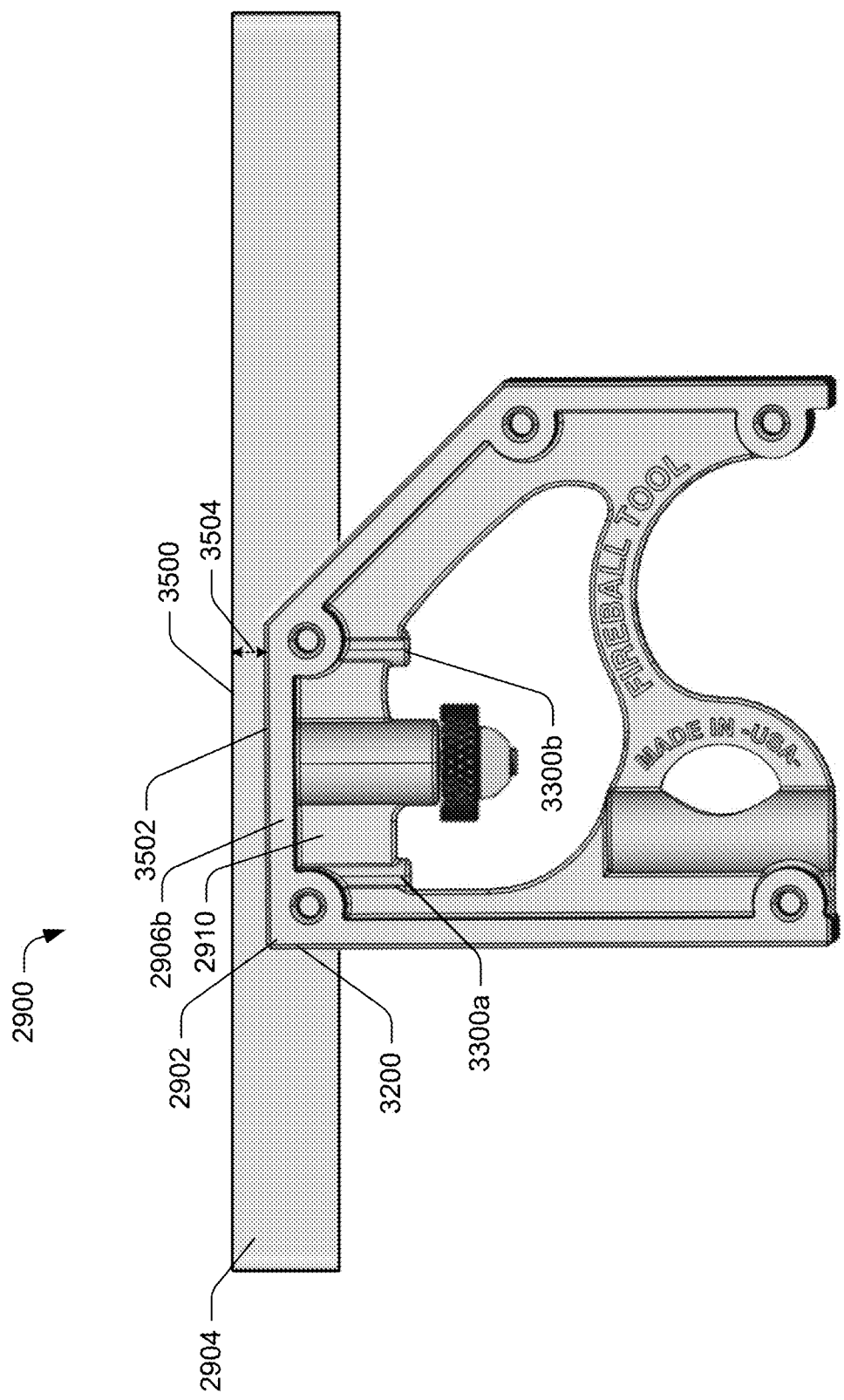
FIG. 35 depicts the adjustable tool with a position of the slidable member manipulated relative to the tool body in accordance with one or more implementations.

FIG. 35 depicts the adjustable tool 2900 with a position of the slidable member 2904 manipulated relative to the tool body 2902 in accordance with one or more implementations. For instance, the adjustment members 3300 are manipulated to adjust a position of slidable member 2904 within the insertion region 2910. In this particular example adjustment of the slidable member 2904 causes a top edge 3500 of the slidable member 2904 to extend above an exterior surface 3502 of the side panel 2906b. For instance, manipulation of the slidable member 2904 via the adjustment members 3300 causes the top edge 3500 to protrude above the slot 3200 and introduces a gap 3504 between the top edge 3500 and the exterior surface 3502.

As mentioned previously the adjustment members 3300 can be implemented in various ways to enable a position of the slidable member 2904 to be adjusted relative to the tool body 2902. For instance, in a threaded scenario, clockwise rotation of the adjustment members 3300 can apply pressure against the slidable member 2904 and push the slidable member 2904 upward within the insertion region 2910 to cause the slidable member to extend out of the slot 3200. Further, counterclockwise rotation of the adjustment members 3300 can release pressure against the slidable member 2904 and allow the slidable member 2904 to receded into the slot 3200 within the insertion region 2910.

Accordingly, the adjustment members 3300 are adjustable to cause the top edge 3500 of the slidable member 2904 to be positioned one or more of coplanar with the exterior surface 3502 of the side panel 2906b, or below the exterior surface 3502 of the side panel 2906b.

Implementations discussed herein include one or more of:

In some aspects, the techniques described herein relate to a workpiece tool including: a first side panel having an interior surface and an exterior surface; a second side panel joined to the first side panel, the second side panel having an interior surface and an exterior surface; a third side panel joined to the first side panel and the second side panel, the third side panel having an interior surface and an exterior surface; and a diaphragm connected to at least portions of the interior surface of the first side panel, the interior surface of the second side panel, and the interior surface of the third side panel, the diaphragm including a first set of apertures that are sized and spaced relative to one another to align with apertures in an adjacent surface.

In some aspects, the techniques described herein relate to a workpiece tool, further including one or more corner portions positioned between one or more of the first side panel, the second side panel, or the third side panel, the one or more corner portions including one or more perforations.

In some aspects, the techniques described herein relate to a workpiece tool, wherein the one or more perforations include one or more tapped holes configured to accept a threaded object.

In some aspects, the techniques described herein relate to a workpiece tool, wherein the diaphragm is inset relative to top edges of the first side panel, the second side panel, and the third side panel.

In some aspects, the techniques described herein relate to a workpiece tool, wherein the diaphragm is coplanar relative to bottom edges of the first side panel, the second side panel, and the third side panel.

In some aspects, the techniques described herein relate to a workpiece tool, wherein one or more of the first side panel, the second side panel, or the third side panel includes a second set of apertures that are sized and spaced relative to one another to align with apertures in an adjacent surface.

In some aspects, the techniques described herein relate to a workpiece tool, wherein one or more a sizing or a spacing of the second set of apertures is substantially similar to one or more of a sizing or a spacing of the first set of apertures.

In some aspects, the techniques described herein relate to a workpiece tool including: a plurality of side panels including a first side panel and a second side panel, wherein each side panel of the plurality of side panels includes a respective interior surface and a respective exterior surface and at least some side panels of the plurality of side panels are interconnected; and a diaphragm connected to at least a portion of an interior surface of the first side panel and an interior surface of the second side panel, wherein the diaphragm includes a first set of apertures that are sized and spaced relative to one another to align with apertures in an adjacent surface, and wherein an exterior surface of the first side panel defines a first plane that intersects a second plane defined by an exterior surface of the second side panel.

In some aspects, the techniques described herein relate to a workpiece tool, wherein the plurality of side panels further includes a third side panel attached to the first side panel at an angled orientation, a fourth side panel attached to the third side panel at an angled orientation, a fifth side panel attached to the fourth side panel at an angled orientation, a sixth side panel attached to the fifth side panel at an angled orientation, and a seventh side panel attached to the sixth side panel and the second side panel.

In some aspects, the techniques described herein relate to a workpiece tool, wherein one or more of the third side panel, the fourth side panel, the fifth side panel, the sixth side panel, or the seventh side panel includes a second set of apertures that are sized and spaced relative to one another to align with apertures in an adjacent surface.

In some aspects, the techniques described herein relate to a workpiece tool, wherein one or more a sizing or a spacing of the second set of apertures is substantially similar to one or more of a sizing or a spacing of the first set of apertures.

In some aspects, the techniques described herein relate to a workpiece tool, wherein the diaphragm includes a cutout region between the first side panel and the second side panel, and wherein the first plane and the second plane extend through the cutout region.

In some aspects, the techniques described herein relate to an adjustable tool including: a tool body including: a first side panel, a second side panel, and a third side panel, the second side panel attached to the first side panel and the third side panel at an angled orientation relative to the first side panel and the third side panel; a fourth side panel attached to the third side panel at an angled orientation relative to the third side panel; and a diaphragm attached substantially perpendicular to the first side panel, the second side panel, the third side panel, and the fourth side panel, the diaphragm forming a slot that perforates an outer surface of the second side panel, an outer surface of the third side panel, and an outer surface of the fourth side panel; and a slidable member positioned at least partially within the slot and being slidable within the slot.

In some aspects, the techniques described herein relate to an adjustable tool, further including one or more adjustment members positioned at least partially within the diaphragm and being adjustable to move within the slot and apply pressure to the slidable member to enable adjustable movement of the slidable member within the slot.

In some aspects, the techniques described herein relate to an adjustable tool, wherein the one or more adjustment members are adjustable to cause a top edge of the slidable member to extend from an exterior surface of the third side panel.

In some aspects, the techniques described herein relate to an adjustable tool, wherein the one or more adjustment members are further adjustable to cause the top edge of the slidable member to be positioned one or more of coplanar with the exterior surface of the third side panel, or below the exterior surface of the third side panel.

In some aspects, the techniques described herein relate to an adjustable tool, wherein the first side panel defines a first plane, the second side panel defines a second plane, and the third side panel defines a third plane, and wherein the second plane intersects the first plane and the second plane.

In some aspects, the techniques described herein relate to an adjustable tool, wherein the second plane intersects the first plane and the second plane at approximately 45 degrees.

In some aspects, the techniques described herein relate to an adjustable tool, wherein the first plane intersect the third plane to form an open region encompassed by the first plane, the second plane, and the third plane, and wherein the slidable member is extendable into the open region.

In some aspects, the techniques described herein relate to an adjustable tool, further including a securing mechanism that is adjustable to allow and restrict slidable movement of the slidable member within the slot.

CONCLUSION

Accordingly, workpiece tools and techniques are described. The workpiece tools are usable to ensure consistent and durable alignment of various workpieces while providing access for performing attachment techniques thereon, which is not possible using conventional tools and techniques. Accessibility cutouts and access spaces may provide a user simultaneous access to points around a joint formed by objects aligned the alignment surfaces. In this way, the workpiece tool provides accessibility that allows a user to operate upon a workpiece, e.g., as by joining aligned objects together, without interfering or obstructing access to the objects. Further, cutouts provide increased access to interior surfaces of the workpiece tool, such as to increase the area available for use of clamps or other fastening devices.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A workpiece tool comprising:
a first side panel having an interior surface and an exterior surface;

a second side panel joined directly to the first side panel, the second side panel having an interior surface and an exterior surface, the exterior surface of the second side panel positioned at a first angled orientation relative to the exterior surface of the first side panel;

a third side panel joined directly to the second side panel and joined directly to the first side panel, the third side panel having an interior surface and an exterior surface, the exterior surface of the third side panel positioned at a substantially right angled orientation relative to the exterior surface of the second side panel and positioned at a second angled orientation relative to the exterior surface of the first side panel, the first side panel, the second side panel, and the third side panel forming a triangular shape;

a diaphragm connected perpendicular to at least portions of the interior surface of the first side panel, the interior surface of the second side panel, and the interior surface of the third side panel, the diaphragm including a first set of circular apertures that are sized and spaced relative to one another to align with a second set of apertures in an adjacent surface, and one or more corner portions positioned between one or more of the first side panel, the second side panel, or the third side panel, the one or more corner portions comprising one or more tapped holes configured to accept a threaded object.

2. The workpiece tool of claim 1, wherein the diaphragm is inset relative to top edges of the first side panel, the second side panel, and the third side panel.

3. The workpiece tool of claim 1, wherein the diaphragm is coplanar relative to bottom edges of the first side panel, the second side panel, and the third side panel.

4. The workpiece tool of claim 1, wherein one or more of the first side panel, the second side panel, or the third side panel includes a second set of circular apertures that are sized and spaced relative to one another to align with apertures in the adjacent surface or an additional adjacent surface.

5. The workpiece tool of claim 4, wherein one or more of a sizing or a spacing of the second set of circular apertures is substantially similar to one or more of a sizing or a spacing of the first set of circular apertures.

6. The workpiece tool of claim 1, wherein one or more of the first side panel, the second side panel, or the third side panel includes a chamfered edge.

7. The workpiece tool of claim 1, wherein the diaphragm has a thickness and one or more of the first side panel, the second side panel, or the third side panel has a different thickness.

8. The workpiece tool of claim 1, wherein the second side panel and the third side panel includes a number of circular apertures and the first side panel includes a different number of circular apertures.

9. A tool comprising:
a tool body including:
a first side panel having an interior surface and an exterior surface;
a second side panel joined directly to the first side panel, the second side panel having an interior surface and an exterior surface, the exterior surface of the second side panel positioned at a first angled orientation relative to the exterior surface of the first side panel;
a third side panel joined directly to the second side panel and joined directly to the first side panel, the third side panel having an interior surface and an exterior surface, the exterior surface of the third side panel positioned at a substantially right angled orientation relative to the exterior surface of the second side panel and positioned at a second angled orientation relative to the exterior surface of the first side panel, the first side panel, the second side panel, and the third side panel forming a triangular shape; and
a diaphragm connected perpendicular to and inset relative to top edges of the first side panel, the interior surface of the second side panel, and the interior surface of the third side panel, the diaphragm including a first set of circular apertures that are sized and spaced relative to one another to align with a second set of apertures in an adjacent surface.

10. The tool of claim 9, further comprising one or more corner portions positioned between one or more of the first side panel, the second side panel, or the third side panel, the one or more corner portions comprising one or more perforations.

11. The tool of claim 10, wherein the one or more perforations comprise one or more tapped holes configurated to accept a threaded object.

12. The tool of claim 9, wherein the diaphragm is coplanar relative to bottom edges of the first side panel, the second side panel, and the third side panel.

13. The tool of claim 9, wherein one or more of the first side panel, the second side panel, or the third side panel includes a second set of circular apertures that are sized and spaced relative to one another to align with apertures in the adjacent surface or an additional adjacent surface.

14. The tool of claim 13, wherein one or more of a sizing or a spacing of the second set of circular apertures is substantially similar to one or more of a sizing or a spacing of the first set of circular apertures.

15. The tool of claim 9, wherein one or more of the first side panel, the second side panel, or the third side panel includes a chamfered edge.

16. An alignment tool comprising:
a tool body;
a first side panel connected directly to the tool body, the first side panel having an interior surface and an exterior surface;
a second side panel connected directly to the tool body and joined directly to the first side panel, the second side panel having an interior surface and an exterior surface, the exterior surface of the second side panel positioned at a first angled orientation relative to the exterior surface of the first side panel;
a third side panel connected directly to the tool body and joined directly to the second side panel and joined directly to the first side panel, the third side panel having an interior surface and an exterior surface, the exterior surface of the third side panel positioned at a substantially right angled orientation relative to the exterior surface of the second side panel and positioned at a second angled orientation relative to the exterior surface of the first side panel, the first side panel, the second side panel, and the third side panel forming a triangular shape triangle;
a diaphragm of the tool body connected perpendicular to at least portions of the interior surface of the first side panel, the interior surface of the second side panel, and the interior surface of the third side panel, the diaphragm including a first set of circular apertures that are sized and spaced relative to one another to align with a second set of apertures in an adjacent surface; and one or more corner portions positioned between one or more of the first side panel, the second side panel, or the third side panel, the one or more corner portions comprising one or more tapped holes configurated to accept a threaded object.

17. The alignment tool of claim 16, wherein the diaphragm is inset relative to top edges of the first side panel, the second side panel, and the third side panel.

18. The alignment tool of claim 16, wherein the diaphragm is coplanar relative to bottom edges of the first side panel, the second side panel, and the third side panel.

19. The alignment tool of claim 16, wherein one or more of the first side panel, the second side panel, or the third side panel includes a second set of circular apertures that are sized and spaced relative to one another to align with apertures in the adjacent surface or an additional adjacent surface.

20. The alignment tool of claim 19, wherein one or more of a sizing or a spacing of the second set of circular apertures is substantially similar to one or more of a sizing or a spacing of the first set of circular apertures.

\* \* \* \* \*